(12) United States Patent
d'Artenay et al.

(10) Patent No.: US 9,387,440 B2
(45) Date of Patent: Jul. 12, 2016

(54) DESALINATION SYSTEM WITH ENERGY RECOVERY AND RELATED PUMPS, VALVES AND CONTROLLER

(75) Inventors: Matthew D. d'Artenay, San Diego, CA (US); Willard D. Childs, Encinitas, CA (US); Gerard J. Vanderloop, Ramona, CA (US); Michael J. Connor, Jr., San Diego, CA (US)

(73) Assignee: General Electric Company, Schenectady, NY (US)

( * ) Notice: Subject to any disclaimer, the term of this patent is extended or adjusted under 35 U.S.C. 154(b) by 690 days.

(21) Appl. No.: 13/250,463

(22) Filed: Sep. 30, 2011

(65) Prior Publication Data

US 2013/0082000 A1    Apr. 4, 2013

(51) Int. Cl.

| | |
|---|---|
| *B01D 61/06* | (2006.01) |
| *B01D 61/08* | (2006.01) |
| *B01D 61/12* | (2006.01) |
| *B01D 61/10* | (2006.01) |
| *B01D 61/02* | (2006.01) |
| *F04B 49/06* | (2006.01) |
| *F04B 49/22* | (2006.01) |
| *C02F 1/44* | (2006.01) |

(52) U.S. Cl.
CPC ............. *B01D 61/10* (2013.01); *B01D 61/025* (2013.01); *B01D 61/06* (2013.01); *B01D 61/12* (2013.01); *C02F 1/441* (2013.01); *F04B 49/06* (2013.01); *F04B 49/22* (2013.01); *B01D 2313/246* (2013.01)

(58) Field of Classification Search
USPC ................................. 210/650, 651, 237, 141
See application file for complete search history.

(56) References Cited

U.S. PATENT DOCUMENTS

| 2,528,131 A | 10/1950 | Garretson |
|---|---|---|
| 2,775,982 A | 1/1957 | Canfield |
| 2,915,042 A | 12/1959 | Shafer |
| 3,022,738 A | 2/1962 | Krute |

(Continued)

FOREIGN PATENT DOCUMENTS

| CA | 2657567 A1 | 3/2008 |
|---|---|---|
| CH | 586364 A5 | 3/1977 |

(Continued)

OTHER PUBLICATIONS

Search Report and Written Opinion from PCT Application No. PCT/US2012/057813 dated Jan. 4, 2013.
Sanz, Miguel Angel, Energy as Motor of Seawater Reverse Osmosis Desalination Development, WISA Membrane Technology Conference 2011, Sep. 11-14, 2011, Umhlanga, South Africa.

(Continued)

*Primary Examiner* — Dirk Bass

(57) ABSTRACT

A fluid pumping system with energy recovery features may provide feed water to a reverse osmosis unit. The system includes an electronic controller unit that regulates the output of three hydraulic pumps. Each hydraulic pump drives the movement of a piston in a cylinder. The pistons collectively deliver a generally constant flow of high pressure feed water. Valve bodies direct reverse osmosis concentrate to the back sides of the pistons. The electronic controller coordinates the output of the hydraulic pumps with the actuation of the valve bodies. Movement of the pistons is controlled, in part, by a feed back loop to verify the desired hydraulic pump output. Valve bodies are designed to begin closing when an associated piston velocity decreases. The valve body moves after a dwell period when an associated piston should not be moving. The piston and cylinder are designed for exposure to high salt-content water.

16 Claims, 7 Drawing Sheets

(56) References Cited

U.S. PATENT DOCUMENTS

| | | |
|---|---|---|
| 3,135,293 A | 6/1964 | Hulsey |
| 3,374,746 A | 3/1968 | Chenault |
| 3,685,536 A | 8/1972 | Bake et al. |
| 3,762,435 A | 10/1973 | Auwerter |
| 3,794,292 A | 2/1974 | Jaegtnes |
| 3,825,122 A | 7/1974 | Taylor |
| 3,977,434 A | 8/1976 | Albright et al. |
| 4,016,083 A | 4/1977 | Sakaguchi et al. |
| 4,145,884 A | 3/1979 | Childs |
| 4,285,365 A | 8/1981 | Coats et al. |
| 4,434,056 A | 2/1984 | Keefer |
| 4,450,863 A | 5/1984 | Brown |
| 4,574,840 A | 3/1986 | Schumann et al. |
| 4,644,969 A | 2/1987 | Watanabe |
| 4,697,619 A | 10/1987 | Tiefenthaler |
| 4,705,627 A | 11/1987 | Miwa et al. |
| 4,724,866 A | 2/1988 | Bates et al. |
| 4,838,145 A | 6/1989 | Slocum et al. |
| 4,913,809 A | 4/1990 | Sawada et al. |
| 5,154,820 A | 10/1992 | Solomon |
| 5,222,873 A | 6/1993 | Whitehead et al. |
| 5,350,047 A | 9/1994 | Kimura et al. |
| 5,476,222 A | 12/1995 | Singer et al. |
| 5,628,198 A | 5/1997 | Permar |
| 5,634,779 A | 6/1997 | Eysymontt |
| 5,645,263 A | 7/1997 | Aardema |
| 5,967,108 A | 10/1999 | Kutlucinar |
| 6,017,200 A | 1/2000 | Childs et al. |
| 6,135,724 A | 10/2000 | Yoder et al. |
| 6,205,780 B1 | 3/2001 | Zervas |
| 6,244,838 B1 | 6/2001 | Couillard et al. |
| 6,263,905 B1 | 7/2001 | Yokota et al. |
| 6,266,598 B1 | 7/2001 | Pillar et al. |
| 6,267,571 B1 | 7/2001 | Anderson et al. |
| 6,468,831 B2 | 10/2002 | Leong et al. |
| 6,470,683 B1 | 10/2002 | Childs et al. |
| 6,491,813 B2 | 12/2002 | Verde |
| 6,623,254 B2 | 9/2003 | Chowaniec et al. |
| 6,652,741 B1 | 11/2003 | Marinzet |
| 6,708,489 B2 | 3/2004 | Massey et al. |
| 6,773,226 B2 | 8/2004 | Al-Hawaj |
| 6,841,076 B1 | 1/2005 | Wobben |
| 7,000,379 B2 | 2/2006 | Makki et al. |
| 7,032,388 B2 | 4/2006 | Healy |
| 7,152,620 B2 | 12/2006 | Baumgarten et al. |
| 7,168,927 B2 | 1/2007 | Brueckmann et al. |
| 7,415,937 B2 | 8/2008 | Giesler et al. |
| 7,540,230 B2 | 6/2009 | Rojanskiy et al. |
| 7,634,911 B2 | 12/2009 | Brinkman |
| 7,753,072 B2 | 7/2010 | Douglas et al. |
| 7,757,714 B2 | 7/2010 | Meinhof |
| 7,905,088 B2 | 3/2011 | Stephenson et al. |
| 7,927,082 B2 | 4/2011 | Haudenschild |
| 8,186,154 B2 | 5/2012 | Nelson et al. |
| 9,119,676 B2 | 9/2015 | Daly et al. |
| 2001/0017278 A1 | 8/2001 | Verde |
| 2002/0000648 A1 | 1/2002 | Leong et al. |
| 2002/0134441 A1 | 9/2002 | Kusumoto et al. |
| 2003/0024239 A1 | 2/2003 | Massey et al. |
| 2003/0116122 A1 | 6/2003 | Haeberer et al. |
| 2003/0118459 A1 | 6/2003 | Gerhardt et al. |
| 2005/0062000 A1 | 3/2005 | Bartell, Jr. et al. |
| 2005/0123416 A1 | 6/2005 | Smith |
| 2006/0071189 A1 | 4/2006 | Cornwell et al. |
| 2007/0045069 A1 | 3/2007 | Schedgick et al. |
| 2007/0128056 A1 | 6/2007 | Haudenschild |
| 2007/0246678 A1 | 10/2007 | Michaels |
| 2010/0063494 A1 | 3/2010 | Orszulak |
| 2010/0154401 A1 | 6/2010 | Sullivan, Jr. et al. |
| 2010/0301252 A1 | 12/2010 | Myran et al. |
| 2011/0017310 A1 | 1/2011 | Eriksson |
| 2011/0077783 A1 | 3/2011 | Karpman et al. |
| 2011/0198290 A1 | 8/2011 | Oklejas |
| 2012/0067432 A1 | 3/2012 | Vigholm et al. |
| 2012/0118810 A1 | 5/2012 | Giles et al. |
| 2014/0154099 A1 | 6/2014 | Sivaramakrishnan et al. |

FOREIGN PATENT DOCUMENTS

| | | |
|---|---|---|
| CN | 2716251 Y | 8/2005 |
| CN | 1721047 A | 1/2006 |
| CN | 2926197 Y | 7/2007 |
| DE | 2444740 A1 | 4/1976 |
| DE | 102007033498 A1 | 1/2009 |
| DE | 102008011982 A1 | 9/2009 |
| EP | 3292267 A2 | 11/1988 |
| GB | 2356432 A | 5/2001 |
| JP | 2005195081 A | 7/2005 |
| JP | 2010063976 A | 3/2010 |
| WO | 9119676 A1 | 12/1991 |
| WO | 03051598 A1 | 6/2003 |
| WO | 2007146321 A1 | 12/2007 |
| WO | 2009151174 A1 | 12/2009 |
| WO | 2010030723 A1 | 3/2010 |
| WO | 2012085326 A1 | 6/2012 |

OTHER PUBLICATIONS

Bross, Stephan et al., SWRO core hydraulic system: Extension of the SalTec DT to higher flows and lower energy consumption, Desalination 203 (2007) 160-167.

Fluid Power Lecture Notes, accessed at http://paws.wcu.edu/ballaaron/www/met441/notes/notes.html on Jul. 3, 2013, Figures 4 and 5, p. 9.

Childs, Willard D. et al., Energy and Capital Cost Savings With a Highly Efficient Integrated Pumping and Energy Recovery System, IDA World Congress—Atlantis, The Palm—Dubai, UAE, Nov. 7-12, 2009.

Search Report and Written Opinion from corresponding PCT Application No. PCT/US2012/055695 dated Dec. 12, 2012.

Childs, Willard D. and Ali Dabiri, Vari-Ro™ Desalting Pilot Plant Testing and Evaluation, Final Technical Report, Science Applications International Corporation; San Diego CA; Water Treatment Technology Program; US Department of the Interior, Bureau of Reclamation, Untied States of America; May 1998.

Denison Hydraulics, GoldCup Digital HI-IQ Control, Electronic Control Card User Manual Software Version 2.2b, Jun. 4, 2002.

International Search Report & Written opinion dated Mar. 17, 2014, issued against related PCT application No. PCT/US2013/071381.

International Search Report & Written opinion dated Mar. 17, 2014, issued against related PCT application No. PCT/US2013/071834.

Office Action dated Mar. 26, 2015, issued against related Chinese application No. 201280047732.5.

Office Action dated Nov. 4, 2015, issued against related U.S. Appl. No. 13/250,674.

Office Action dated Dec. 3, 2015, issued against related U.S. Appl. No. 13/693,762.

Office Action dated Dec. 18, 2015, issued against related U.S. Appl. No. 13/693,743.

Childs et al., "VARI-RO Direct Drive Engine Study", Science Applications International Corporation, pp. 1-54, Sep. 1998.

Stover, "Energy Recovery Devices for Seawater Reverse Osmosis", Everything About Water, pp. 40-46, Nov. 2006.

Sun et al., "Energy Recovery Device with a Fluid Switcher for Seawater Reverse Osmosis System", Chinese Journal of Chemical Engineering, vol. 16, Issue 2, pp. 329-332, 2008.

Contreras, "An Energy Recovery Device for Small-Scale Seawater Reverse Osmosis Desalination", A Doctoral Thesis, Submitted in partial Fulfilment of the Requirements for the Award of Doctor of Philosophy of Loughborough University, pp. 1-146, Dec. 9, 2009.

Printout of "GE Introduces Major Energy Efficiency Breakthrough for Desalination Plants", General Electrical, Jul. 2, 2012, retrieved on Jun. 3, 2013 from http://www.businesswire.com/news/home/20120702005198/en/GE-Introduces-Major-En.

PCT Search Report and Written Opinion issued in connection with corresponding PCT Application No. PCT/US2013/071829 on Mar. 17, 2014.

(56) References Cited

OTHER PUBLICATIONS

Unofficial English translation of Chinese Office Action issued in connection with corresponding CN Application No. 201280047713.2 on Feb. 9, 2015.

Non-Final Office Action issued in connection with corresponding U.S. Appl. No. 13/711,966 on Sep. 2, 2015.
Final Office Action issued in connection with corresponding U.S. Appl. No. 13/711,966 on Feb. 16, 2016.
Non-Final Office Action issued in connection with corresponding U.S. Appl. No. 13/250,674 on Mar. 32, 2016.
A List of Related US Cases to this application on Mar. 3, 2016.

DESALINATION SYSTEM WITH ENERGY RECOVERY AND RELATED PUMPS, VALVES AND CONTROLLER

FIELD

The present disclosure relates generally to desalination, and to recovering energy from pressurized fluids. A system and process are described having a set of positive displacement pumps to provide a high pressure flow of a fluid, valves to return a portion of the fluid to the positive displacement pumps, and an electronic controller for operating the positive displacement pumps and valves.

BACKGROUND

Many areas of the world do not have adequate fresh water supplies, but they are able to obtain seawater. Seawater can be desalinated using reverse osmosis, among other processes. To desalinate seawater by reverse osmosis (RO), the feed water must be pressurized above the osmotic pressure of the feed water. The feed water becomes concentrated during the process, and its osmotic pressure increases. Typical feed water pressures for seawater reverse osmosis (SWRO) are in the range of 50-70 bar.

Given the high feed water pressures, energy costs (typically in the form of electrical consumption) are the largest component of the operating cost of a SWRO plant. Through various improvements, the amount of energy used per unit of water produced by SWRO has decreased over time. For example, high pressure multi-stage turbine pumps have become more efficient, to about 70% nominal efficiency. Power recovery turbines are now used to recover some of the energy in the concentrated brine flow leaving the RO modules. Recovery rates have been optimized to balance the cost of pre-treating and pumping feed water (which decreases with increased recovery rate) with the cost of producing desalinated water (which increases with increased recovery rate). Despite these improvements, however, energy costs are still a significant portion of the cost of desalinated water.

Energy consumption also interferes with adopting advances in RO membrane technology. Advances in RO membrane technology have included membrane elements that are capable of operating above 70 bar, and with recovery rates of 55% or more. In theory, a higher recovery rate should allow for decreased capital costs and decreased raw feed water flow. Decreasing the flow of raw feed water would in turn produce savings in pre-treatment and feed water pumping, and reduce the environmental damage caused by withdrawing seawater. However, as mentioned above, when the feed water is concentrated its osmotic pressure increases. As recovery rate increases, so does the feed water concentration, osmotic pressure and energy consumption. The key to breaking this cycle is to recovery more of the energy imbedded in the brine leaving the RO modules. The pressure of the brine also increases with osmotic pressure. Accordingly, there is more energy embedded in the brine of a high recovery process. If a greater percentage of this embedded energy can be recovered, there will be a direct reduction in energy consumption, as well as the possibility of further reductions due to an increase in the optimal recovery rate.

Despite incremental improvements over time, turbine based pumps and energy recovery devices are limited in their energy efficiency. Turbine based technologies are used because they are familiar and easy to use to produce constant flow rates and pressures through the SWRO plant. Adopting a different approach, Childs et al. described a piston based pumping and energy recovery system in U.S. Pat. No. 6,017,200, entitled Integrated Pumping and/or Energy Recovery System. This system uses a piston driven by a hydraulic pump to provide pressurized feed water to an RO membrane module. The front face of the piston drives the feed water to the RO module. The back face of the piston receives brine from the RO module. The pressure of the brine acting on the back face of the piston reduces the power required from the hydraulic pump to move the piston.

In the Childs et al. system, "energy recovery" valves admit brine to the back face of the piston on a forward stroke. Additional discharge valves allow the admitted brine to leave the piston on a backward stroke. The energy recovery and discharge valves are controlled by a control unit that also operates the hydraulic pump. The control unit synchronizes the movements of the valves with the movement of the piston. Because the piston reciprocates, it must accelerate and decelerate and therefore inherently produces an uneven rate of flow and pressure of the feed water. However, when a set of pistons are used, their output may be synchronized to produce a fluctuating, but nearly constant, combined out pressure. Although subject to various practical difficulties, the Childs et al. system has the potential to efficiently produce a high pressure flow of feed water.

SUMMARY OF THE INVENTION

The present disclosure describes a pumping system and process with energy recovery from a pressurized fluid stream. The pumping system and process may be used, for example, to provide feed water to a reverse osmosis (RO) system and recover energy from the brine leaving the RO system. The system and process have a set of piston based pumps, valves to return brine to the pumps, and an electronic controller for operating the pumps and valves. The system and process are generally similar to the Childs et al. system described above. However, improvements have been made to the pumps, the valves, the control unit, the timing of the valve movements relative to the pumps, and to the system and process as a whole.

In the system described in U.S. Pat. No. 6,017,200, a hydraulic pump is used to drive a piston rod. The piston rod in turn drives a piston in a cylinder to pressurize feed water, and cause the feed water to flow to RO membranes. The output of the hydraulic pump is controlled by a control unit. Due to the mechanical coupling of the piston rod (driven by the hydraulic pump) to the piston, the electronic control unit determines the velocity of the piston at any given time. The electronic control unit is programmed with a velocity profile representing the desired velocity of the piston over time. The control unit instructs the hydraulic pump to produce an output intended to cause the piston to follow the velocity profile. The control unit receives feedback on whether the piston is in fact following the velocity profile from a sensor which indicates the location of the connecting rod at different points in time. This control loop provides some ability for the control unit to correct errors in the velocity of the piston by modifying the output of the hydraulic pump.

In the system and process described herein, an additional sensor is provided to indicate the output of the hydraulic pump. The control unit uses information on the output of the hydraulic pump to determine if the hydraulic pump is in fact providing the output desired at that time, and to correct the output of the hydraulic pump if required. The addition of this control loop, incorporating measured information from a sensor indicating the output of the hydraulic pump, allows the control unit to cause the piston to follow the desired velocity profile more accurately.

The energy recovery and discharge valves described in U.S. Pat. No. 6,017,200 were moved between open and closed states by a solenoid that was in turn operated by the control unit. These valves moved during brief dwell periods when an associated piston should not be moving. In the system and process described herein, valves are used which respond to variations in the rate of flow through them. In particular, the valves move towards a closed position when the rate of flow through them decreases. In this way, at least part of a required movement to close a valve occurs automatically before the dwell period.

Mechanically, the valve has a piston that closes against a downstream seat inside of a valve body. The face of the piston has two effective surface areas, for example a central area and an outer ring. Water flowing through the valve passes around the piston. The outer ring is located upstream of a bend in the valve body that cause a head loss to flowing water. Because of this head loss, when water is flowing though the valve the static pressure on the central area of the piston is less than the static pressure on the outer ring. The back of the piston is connected to the downstream static pressure. Accordingly, when water is flowing through the valve, the piston is pushed towards an open position by a force that increases with the flow rate of the water. A spring may be used to bias the piston towards the closed position. At high flow rates, the additional pressure on the outer ring, relative to the downstream pressure in the valve body, overcomes the spring and keeps the valve open. However, as the flow rate decreases, the additional pressure on the outer ring decreases and the valve is able to move towards a closed position.

Other improvements are also described below. For example, the feed water driving piston may operate within a cylinder that receives both feed sea water and rejected RO brine. The feed water and brine are corrosive and cause friction between the piston and cylinder. The piston and cylinder are made using corrosion resistant and low friction materials, and to allow for maintenance when required.

For further example, the dwell time in the process described below includes a wait period before the valves are moved. This wait period allows for delay in a feed water driving piston stopping completely according to its velocity profile. The wait period therefore minimizes the possibility of a valve moving while water is still flowing through it.

Individually, or in combinations of one or more of the features described above or in the detailed description to follow, the features allow the system to operate more reliably or to produce a more nearly constant output pressure.

DETAILED DESCRIPTION

Figure 1:
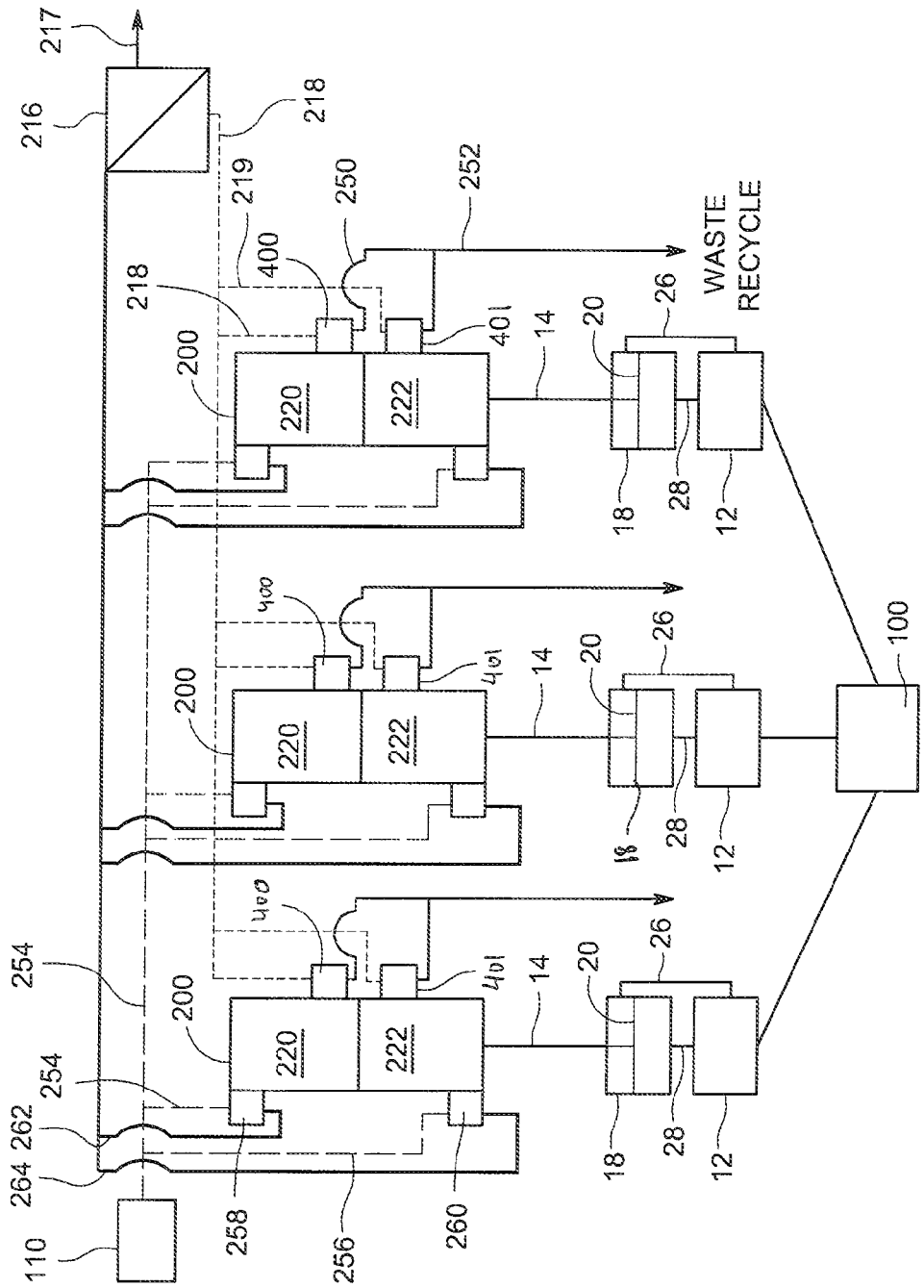
FIG. 1 is a schematic of a fluid pumping and energy recovery system in combination with a reverse osmosis system.

As depicted in FIG. 1, a system 10 includes a source of feed water 110, three hydraulic pumps 12, a water cylinder 200 for each hydraulic pump 12, an RO membrane unit 216, and a control unit 100. The system 10 is similar to the system described in U.S. Pat. No. 6,017,200, which is incorporated by reference, but will also be described below.

Under instruction from the control unit 100, each hydraulic pump 12 controls the movement of an individual piston rod 14. The piston rod 14 is mechanically coupled to two, dual-action pistons 224, 226 (not shown in FIG. 1), that are housed within a water cylinder 200. As will be further described below, the hydraulic output of each hydraulic pump 12 causes the piston rod 14 to move. Due to the mechanical coupling, the movement of the piston rod 14 causes the two, dual-action pistons 224, 226 to move in unison with the movement of the piston rod 14. The piston rod 14 and the two-dual action pistons 224, 226 may collectively be referred to as a reciprocating assembly 300. For clarity, this disclosure will describe the features of a single pump and reciprocating assembly, but it is understood that this similarly describes the features of all the hydraulic pumps and reciprocating assemblies in the system.

A source of feed water 110, which includes sources of sea water, brackish water and the like, is connected to and supplies feed water to the water cylinder 200 by feed water supply lines 254, 256 (indicated as the long dashed line in FIG. 1).

The system 10 also includes high pressure feed water supply lines 262, 264 to direct a high pressure feed water from the water cylinder 200 to the RO membrane unit 216 (indicated as the thick solid line in FIG. 1).

The RO membrane unit 216 produces a volume of permeate, that is desalted water, which is directed by the permeate line 217 for the desired uses of the desalinated filtrate product. The process 216 also produces a volume of high pressure concentrate. The high pressure concentrate is directed from the process 216 by lines 218, 219 back to the water cylinder 200 (indicated as the dotted lines in FIG. 1).

The water cylinders also include a low pressure concentrate outlet, as described further below, that is connected to low pressure concentrate discharge lines 250, 252 which direct the low pressure concentrate to a waste stream or recycle stream depending upon the particulars of the overall system (indicated as the thin solid line in FIG. 1).

From a general perspective, there are four distinct hydrostatic pressures within this system. The first pressure P1 is the pressure that supplies the feed water from the source 110, through lines 254, 256 to the water cylinder 200. P1 can be provided by a variety of known pumps. The second pressure P2, which is substantially higher than P1, is the pressure exerted on the feed water from the water cylinder 200, through lines 262, 264, to the RO membrane unit 216. As described below, P2 is provided by the dual-action pistons 224, 226 of the water cylinder 200. The third pressure P3, is the hydrostatic pressure of the concentrate fluid as it leaves the RO membrane unit 216 to return to the water cylinder 200, via lines 218, 219. P3 is slightly less than P2 because some of the energy is used to drive the desalinated water out of the RO membrane unit 216, into permeate line 217. The fourth pressure P4 is the pressure of the concentrate as it leaves the water cylinder 200 via lines 250, 252 to the waste or recycling stream. P4 is less than P3.

For example, P1 is substantially in the range of 5 to 100 p.s.i.; P2 is in the range of 600 to 1000 p.s.i.; P3 is in the range of 500 to 950 p.s.i.; and P4 is 1 to 50 p.s.i.

The Hydraulic Pump

Under the control of the control unit 100, the pump 12 imparts a desired velocity profile upon the piston rod 14. The hydraulic pump 12 includes a source of rotational energy that translates the rotational energy into the flow of hydraulic fluid. Therefore, the hydraulic pump 12, on command from the control unit 100, produces a hydraulic output, as described herein further below, that can range from a maximal hydraulic output to zero hydraulic output to maximal hydraulic output in the opposite direction. The hydraulic output of pump 12 is translated into the reciprocating displacement of the piston rod 14.

The piston rod 14 is located inside the hydraulic cylinder 18. Attached at one end of hydraulic cylinder is line 26 and attached at the other end of hydraulic cylinder 18 is line 28. The lines 26 and 28 direct the hydraulic output of the pump 12 to either side of a piston 20 that is located inside the hydraulic cylinder. The piston rod 14 may be connected to one face of the piston 20 and another rod 30 (shown in FIG. 6) may be connected to the opposite face of the piston. Alternatively, the piston rod 14 may extend through both faces of the piston 20.

Figure 2:
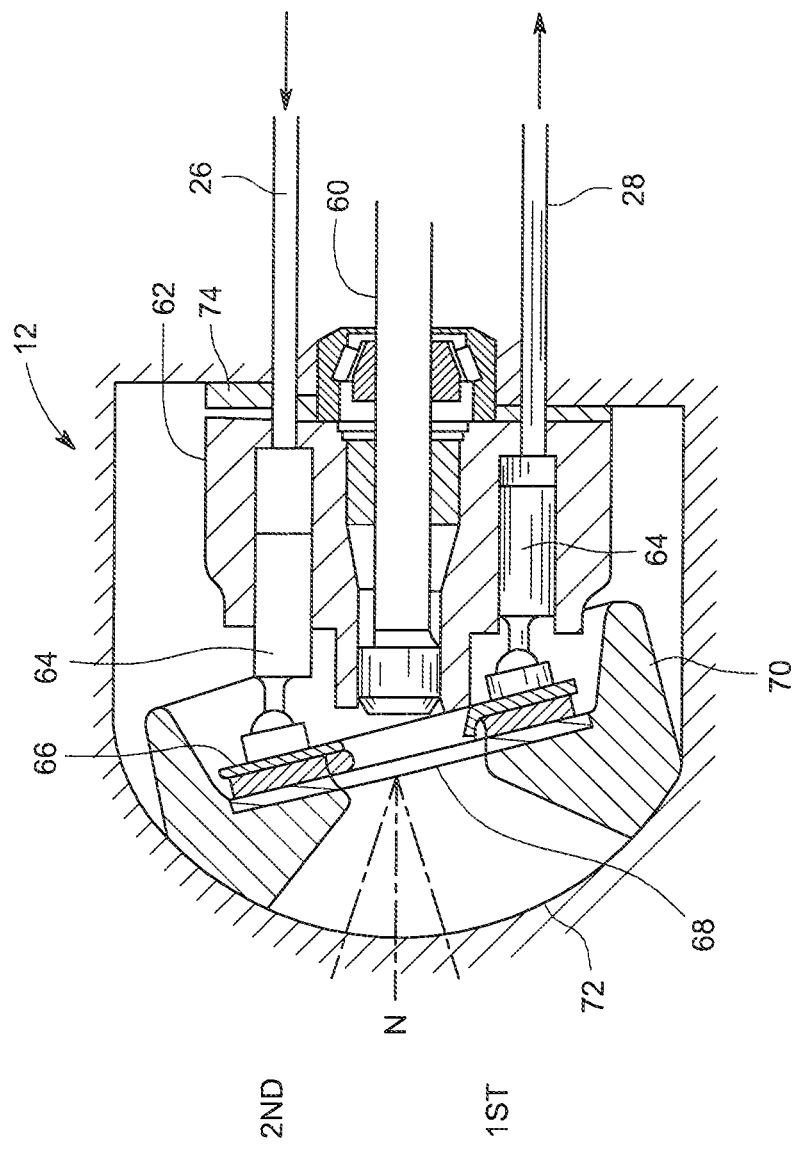
FIG. 2 is a schematic, cross-sectional view of a portion of a hydraulic pump used in the systems of FIG. 1.

As shown in FIG. 2, the hydraulic pump 12 includes a motor (not shown) that imparts rotational energy upon a drive shaft 60. The drive shaft 60 turns at a constant number of rotations per minute. The drive shaft is operationally connected, for example by a spline or rack and pinion arrangement, to a barrel 62 which houses a plurality of axial pistons 64 within piston bores. Each of the pistons 64 terminates in a ball on which is swaged a shoe 66 and the shoe is free to pivot as well as rotate at each piston ball. The shoe 66 bears against a thrust plate 68, sometimes referred to as a creep plate by those skilled in the art, which in turn bears against a swash plate 70, which is shown angled to the axis of shaft 60. The swash plate 70 does not rotate, but under instruction from the control unit 100, the swash plate 70 can be tilted around an axis perpendicular to the shaft 60 axis.

When the drive shaft 60 rotates, the thrust plate 68, the barrel 62 and each piston 64 rotate around the drive shaft 60. As the pistons rotate around the drive shaft 60, they follow the angle of the swash plate 70. Following the angle of the swash plate 70 causes the pistons to articulate in and out of the bores in the barrel 62 thereby displacing hydraulic fluid and affecting the hydraulic output of pump 12. In this instance, the hydraulic output of pump 12 refers to the stroke amplitude of the pistons 64 within the pump 12 and the flow of hydraulic fluid within lines 26 and 28.

The angle of the swash plate 70 determine the hydraulic output of the hydraulic pump. For example, if the swash plate angle is positioned in a first position as designated by the symbol ($1^{st}$) in FIG. 2, hydraulic fluid will be pumped into line 28 and discharged from line 26, which causes hydraulic cylinder piston 28 of FIG. 1 to move in a first direction. When the cam angle is substantially perpendicular to the axis of the drive shaft 60, at position N in FIG. 2, there is no articulation of the pistons 64, relative to the barrel 62 and there is no displacement of hydraulic fluid into or out of lines 26 and 28, the hydraulic output of the pump 12 is zero and the unit is in neutral. When the cam angle is changed to the second position ($2^{nd}$), line 28 becomes the discharge line and line 26 is the inlet line thereby causing piston 20 of FIG. 1 to move in a second direction, opposite to the first direction.

The hydraulic output from the hydraulic pump 12 can be changed from a maximum value in one direction smoothly through zero to a maximum value in the opposite direction as the control unit 100 dictates the angle of the swash plate 70 from one side of center through neutral to the other side.

The Water Cylinder

Figure 3:
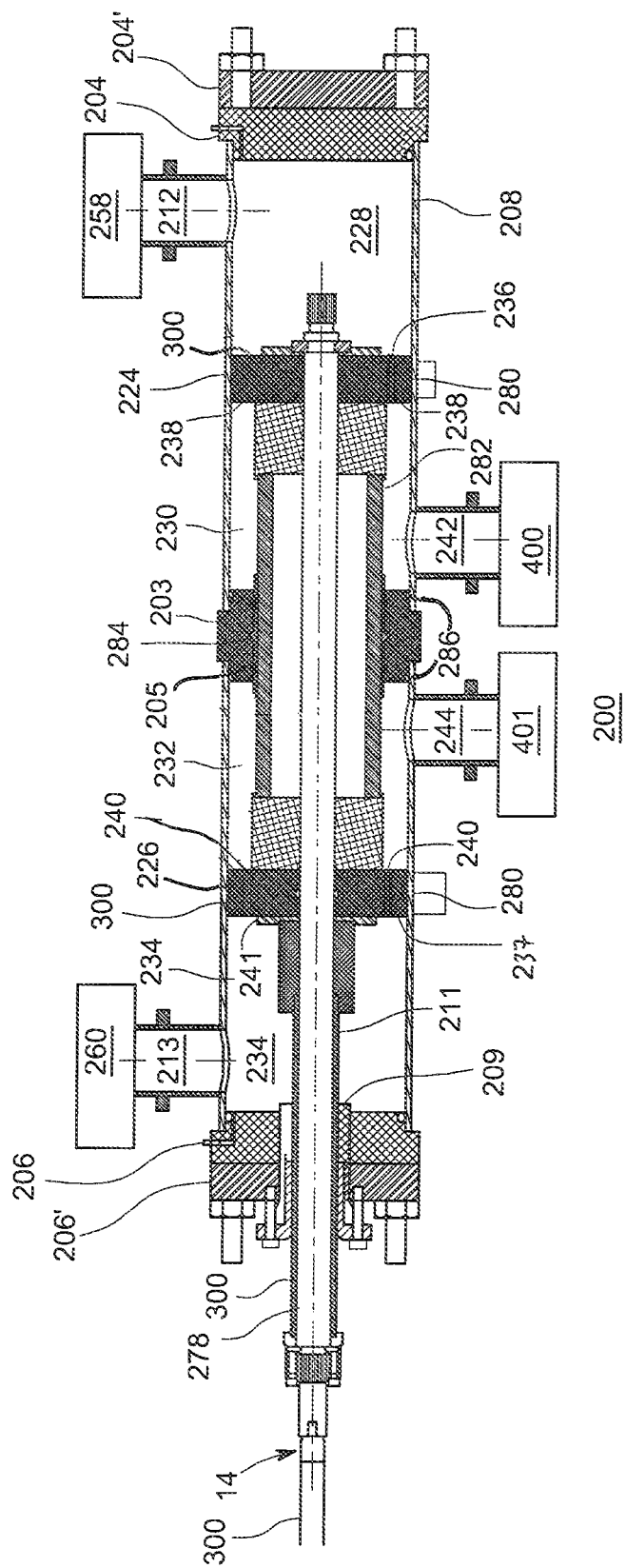
FIG. 3 is a cross-sectional, schematic view of a water cylinder used in the systems of FIG. 1.

As shown in FIG. 3, the water cylinder 200 is generally tubular in shape with two end plates 204, 206 and a lateral wall 208 that extends between the end plates. The water cylinder 200 also includes intermediate plates 203 and 205, which divide the internal bore of the water cylinder 200 into two piston chambers 220 and 222. Within each piston chamber 220 and 222 there is a reciprocating, dual-action piston 224 and 226, each of which defines a feed water working chamber 228, 234 and a concentrate working chamber 230, 232. The dual-action pistons 224, 226 are mechanically coupled by a connection rod 278 which extends through an aperture in both of the intermediate plates 203, 205. The connection rod 278 also extends out of the water cylinder, through a bearing and seal assembly 209 within the end plate 206 so that no pressure or fluid leaks across the end plate 206 from the feed water working chamber 234.

The feed water working chamber 228 is defined by the inner surface of end plate 204, the inner surface of lateral wall 208 and the front face 236, also called the feed water face, of the piston 224. The feed water working chamber 234 is defined by the inner surface of end plate 206, the inner surface of lateral wall 208 and the front face 237, also called the feed water face, of the piston 226. The feed water chambers 228, 234 each have a feed water access port 212, 213 to provide fluid communication across the lateral wall 208 of the feed water working chambers 228, 234, for example to allow the inlet and outlet of feed water.

The concentrate working chamber 230 is defined by the inner surface of the intermediate plate 203, the inner surface of the lateral wall 208 and the back face 238, also called the concentrate face, of piston 224. The concentrate working chamber 232 is defined by the inner surface of the intermediate plate 205, the inner surface of the lateral wall 208 and the back face 240, also called the concentrate face, of piston 226. The feed water face 236, 237 is positioned opposite to the back face 238, 240 of the pistons. The concentrate working chambers 230, 232 each have a concentrate access port 242, 244 to provide fluid communication across the lateral wall 208 of the concentrate working chambers 230, 232, for example to allow the inlet and outlet of concentrate.

The dual-action pistons 224, 226 include one or more seals 280 between the perimeter of the dual-action pistons 224, 226 and the lateral wall 208 to prevent the movement of fluid between the feed water working chambers 228, 234 and the concentrate working chambers 230, 232 so that there is no fluidic communication across the dual-action pistons 224, 226. The one or more seals 280 are sufficiently resilient to withstand the differential pressure across the pistons 224, 226 causes by different hydrostatic pressures within the feed water working chambers 228, 234 and the respective concentrate working chambers 230, 232.

As described above, the dual-action pistons 224 and 226 are mechanically coupled by a connection rod 278. The connection rod 278 is also mechanically coupled to the piston rod 14 so that both dual-action pistons 224 and 226 move in unison with the piston rod 14. As described above, the piston rod 14, the connection rod 278 and the dual-action pistons 224 and 226 are collectively referred to as the reciprocating assembly 300.

As described herein below, the movement of the reciprocating assembly 300, including the actual stroke distance of the dual-action pistons 224, 226 within the water cylinder 200 can change. Therefore, the volume of the feed water working chambers 228, 234 and the volume of the concentrate working chambers 230, 232 can also be defined by the cross-sectional area of the dual-action pistons 224, 226 multiplied by the differential position of the dual-action pistons 224, 226 at the beginning and the end of a stroke of the reciprocating assembly 300.

The Desalination Process

The RO membrane unit 216 is a reverse osmosis filtration process that includes a selectively permeable membrane (not shown). The feed water, at pressure P2, enters one end of the RO membrane unit 216 and a volume of permeate, desalted water, crosses the selectively permeable membrane to enter into a permeate line 217. Effectively, the RO membrane unit 216 removes a volume of permeate from the initial volume of feed water. This has two primary effects on the remaining feed water: (i) this causes a decrease in the total volume of water that enters the high pressure concentrate lines 218, 219 and ultimately enters the concentrate working chambers 230 and 232, this difference is referred to as the recovery ratio; and (ii) the high pressure concentrate is more concentrated and therefore more corrosive than the feed water, which is already corrosive in nature.

The Ratio Sleeve

To compensate for the recovery ratio, a ratio sleeve 282 is placed around the connection rod 278, between the back faces 238, 240 of the dual-action pistons 224, 226. The ratio sleeve 282, also referred to as a ratio rod, is of greater diameter than the connection rod 278 and this decreases the working volume of the concentrate working chamber 230, 232, in comparison to the volume of the feed water working chambers 228, 234. For example, if the recovery ratio of the RO membrane unit 216 is 30%, then the diameter of the ratio sleeve 282 is such that the volume of concentrate pumped out of the concentrate working chamber 230, 232 is 30% smaller than the volume of feed water pumped out of the feed water working chambers 228, 232.

As shown in FIG. 3, the sleeve 282 is part of the reciprocating assembly 300 and the sleeve 282 moves through both the intermediate plates 203, 205. To prevent the communication of fluid or pressure between the concentrate working chambers 230, 232, a ratio sleeve seal assembly 284 is positioned on the inner surface of the lateral wall 208 at the apertures to provide one or more seals 286 against the outer surface of the ratio sleeve 282.

Corrosive Resistant, Low Friction Materials

As described above, various surfaces of the water cylinder 200 and the reciprocating assembly 300 come in direct contact with a corrosive and salty feed water. Further, various other surfaces of the water cylinder 200 come in contact with the highly corrosive, high pressure concentrate. The reciprocating assembly 300 moves within the feed water and the high pressure concentrate and this movement is against a high degree of friction with the contact surfaces of the water cylinder 200. Therefore, various surfaces of the water cylinder 200 and the reciprocating assembly 300 are made with specific materials that are resistant to the corrosive properties of the feed water and the high pressure concentrate. The seals used between the contact surfaces between the water cylinder 200 and the reciprocating assembly 300 have a very low surface profile or other properties so that there is a low coefficient of friction between the seal and the sealing surface.

For example, the lateral wall 208 and the connection rod 278 of the water cylinder 200 are made from super-austentic materials, such as AL6XN, 2205 duplex stainless steel, 2507 super duplex stainless steel, 254SMO stainless steel or fiberglass. The differential pressure across the dual-action pistons 224, 226 (i.e. the difference between P2 and P3) is relatively low, in comparison to other piston pumps systems. This lower differential pressure is due to the pressurized concentrate within the concentrate working chambers 230, 232 acting on the back faces 238, 240 of the dual-action pistons 224, 226. This comparatively low differential pressure across the dual-action pistons 224, 226 allows for the use of corrosive resistant materials that are lighter, and less expensive than the super-austentic materials. For example, the dual-action pistons 224, 226, can be made with corrosive resistant, polymers, such as polyoxymethylene.

To provide further support to the polymer dual-action pistons 224, 225, support plates 241 made of super-austentic materials may be positioned on the feed water faces 236, 237 to assist in securing the dual-action pistons 224, 226 to the connection rod 278. The support plates 241 also assist in spreading the physical load across the dual-action pistons 224, 226 which decreases deflection as the reciprocating assembly 300 moves. The reciprocating assembly 300 is held in relatively high tension by a high torque nut on the connection rod 278 that maintains this high tension by holding the super-austentic and ceramic materials (as described below) as one contiguous assembly. This high tension assists in mitigating compression set or creep within the polymer materials, which can cause relaxation of the tension across the reciprocating assembly 300.

The end plates 204, 206, can also be made of polymers, such as polyoxymethylene. The polymer end plates 204, 206 are further supported by additional end-plates 204', 206' that are made of a more rigid material, such as SS316 stainless steel are provided on the outside surface of the end plates 204, 206, as shown in FIG. 3.

The intermediate plates 203, 205 are subjected to smaller physical forces, in comparison to the endplates 204, 206 because the larger diameter of the ratio sleeve 282 occupies a greater amount of the working surface area of the concentrate working chambers 230, 232.

The connection rod 278 can include a sleeve 211 that is made of materials that have corrosion-resistant properties and have a low surface profile, for example ceramic. The bearing and seal assembly 209, is made of a polymer, such as polyoxymethylene or polyetherimide, and includes a stuffing box, so that the friction between the ceramic sleeve 211 and the bearing and seal assembly 209 is minimized. The ceramic sleeve 209 may extend a length of the connection rod 287 that equals the maximal distance the reciprocating assembly 300 will move.

The ratio sleeve 282 also moves through the ratio sleeve seal adapter 284 and seals 286 of the intermediate plates 203, 205 and it is made of materials that have corrosion-resistant properties and have a low surface profile, for example ceramic.

The seals 286 at the periphery of the piston are made with materials that are suitable for creating the lowest coefficient of friction with the ratio sleeve 282, for example polytetrafluoroethylene.

The ratio sleeve seal assembly 284 is made of a suitable polymer, such as polyoxymethylene or polyetherimide. The ratio sleeve seal assembly 284 can be made of a plurality of pieces, for example n+1, where n represents the number of seals 286 that are employed. Each individual piece of the ratio sleeve seal assembly 284 extends around the internal diameter of the ratio sleeve seal assembly. When assembled, the plurality of pieces have lateral connections to each other (not shown) to removably secure the pieces together with an individual seal 286 secured therebetween. The plurality of pieces of the ratio sleeve seal assembly 284 facilitate access to the seals 286, therein, and further allows for access to the ratio sleeve 282 if maintenance is required. In an additional optional feature, the ratio sleeve seal assembly 284 can extend different distances from the lateral wall 208 to accommodate different outer diameters of ratio sleeves 282. For example, if the recovery ratio of the RO membrane unit 216 changes, for what ever reason, then the volume of the concentrate working chambers 230, 232 can accordingly be adjusted by the use of ratio sleeves 282 of different outer diameters.

In an optional feature, the connection rod 278 includes a spacer 279 that is positioned between one end of the ceramic sleeve 211 the support plate 241 which is located on the feed water surface 237 of the dual-action piston 226. The spacer 279 is made of similar super-austentic materials, as described above, and the spacer 279 assists in stabilizing the mechanical coupling of the ceramic sleeve 211, the connection rod 278, the support plate 241 and the dual-action piston 226.

In another optional feature, the ratio sleeve 282 includes a ratio spacer 283 made from a corrosive-resistant polymer, such as polyoxymethylene or polyetherimide. The ratio spacer 283 is positioned at each end of the ratio sleeve 282 between the ratio sleeve 282 and the back faces 238, 240 of the dual-action pistons 224, 226. The ratio spacer 283 extends from the feed water face 238 towards the center of the ratio sleeve 282 to decrease the amount of ceramic that utilized in the ratio sleeve 282 and therefore decrease the total weight of the ratio sleeve 282, which is important to decrease the amount of energy required to move the reciprocating assembly 300. However, the ratio sleeve 282 will extend between the ratio spacers 283 a sufficient length to ensure that the ratio sleeve 282 is the only surface that the seal 286 forms a seal against during the movement of the reciprocating assembly 300.

In another optional feature, the bearing and seal assembly 209 can be a series of seals that wrap around the connection rod 287 and extend along the connection rod 287 away from the feed water working chamber 234 (not shown). The seal closest to the feed water working chamber 234 is subject to the greatest amount of lubrication, caused by the feed water, however, this seal has the lowest compression of the bearing and seal assembly 209. By contrast, the seal that is furthest from the feed water working chamber 234 has the lowest lubrication and the highest compression. The selection of materials, sequence, seal geometry and possibly spring re-enforcement can prolong the lifespan of the bearing and sealing arrangement 209.

In another optional feature, the seals 286 can be strips of seal material that have ends cut on a bias (not shown). The purpose of this feature is that it is known that seals 286 made of polytetrafluoroethylene will wear over time, the biased edge allows the seals to self-seal over time to reduce the maintenance burden associated with maintaining a fluid and pressure seal against the ceramic ratio sleeve 282.

In another optional feature, the one or more seals 280 between the perimeter of the dual-action pistons 224, 226 and the lateral wall 208 can also be made of polytetrafluoroethylene.

In another optional feature, there is a hollow cavity defined by an inner surface of the ratio sleeve 282 and the outer surface of the connection rod 278. A port at one end of the ratio sleeve 282, not shown, provides fluid communication between the concentrate working chambers 230, 232 and the hollow cavity. The hollow cavity decreases the amount of ceramic used in the ratio sleeve 282, decreases the overall weight of the reciprocating assembly 300 and therefore decreases the amount of work that the hydraulic pump 12 is required to perform to move the reciprocating assembly 300.

The Feed Water Valve Assembly

As shown in FIG. 3, the piston chambers 220, 222 include a feed water valve assembly 258, 260 which regulate the flow of feed water through the feed water access ports 212, 213 to the feed water working chambers 228, 234. For example, when feed water is desired to be supplied to feed water working chamber 228, feed water valve assembly 258 is open to line 254 so that feed water can flow from the source 110, through line 254, and into the feed water working chamber 228 via feed water access port 212. If the feed water valve assembly 258 is closed to line 254, no feed water will flow into the feed water working chamber 228. To supply feed water to the feed water working chamber 234, feed water valve assembly 260 can open to line 256 so that feed water flows from the source 110, through line 256 to the working chamber 234, via feed water access port 213. If feed water valve assembly 260 is closed to line 256 then no feed water will flow into the feed water working chamber 234.

For feed water to exit the feed water working chambers 228, 234 the feed water valve assembly 258, 260 are closed to lines 254, 256 and open to lines 262, 264.

Figure 4:
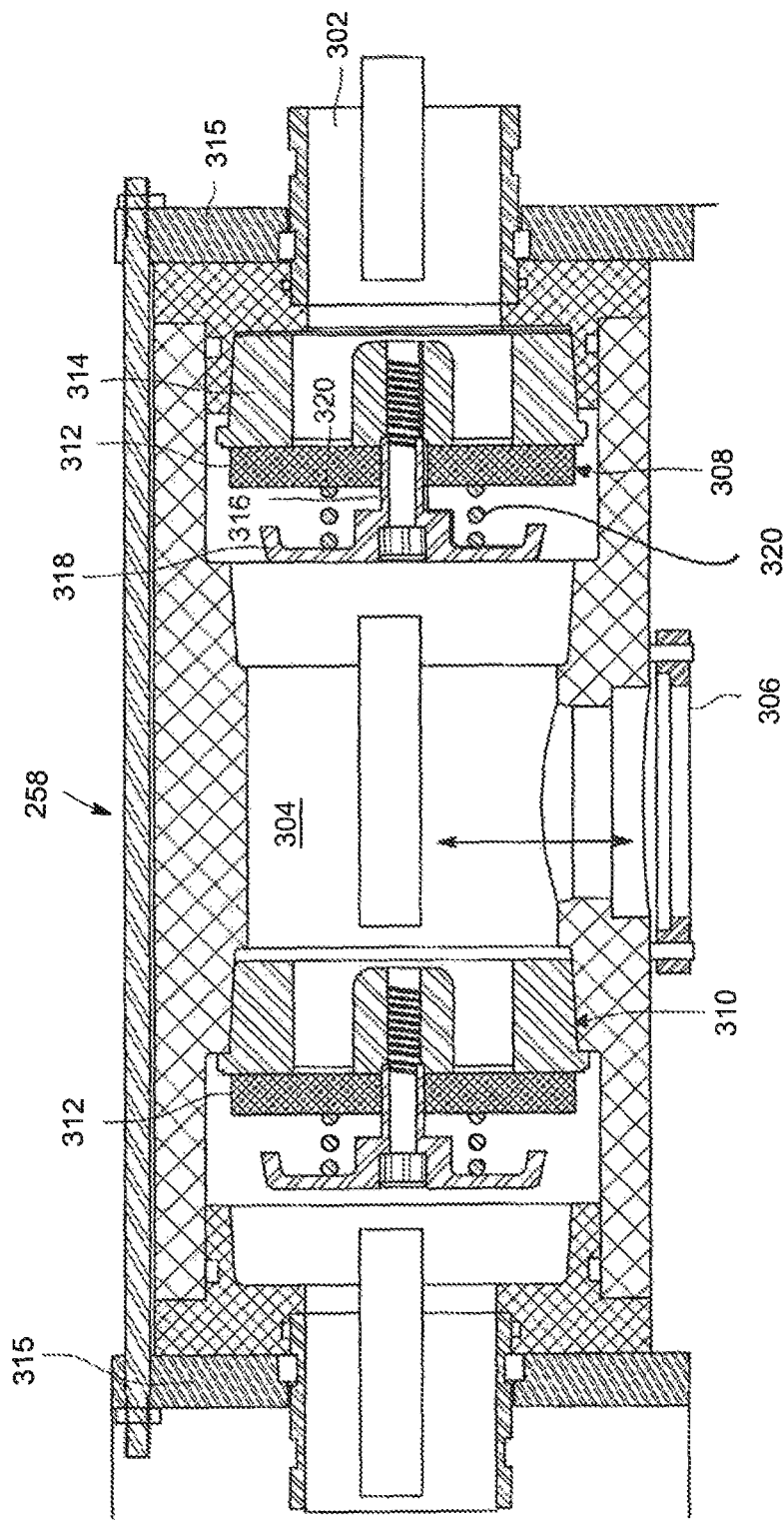
FIG. 4 is a cross-sectional, schematic view of a feed water valve used in the systems of FIG. 1.

The feed water valve assemblies 258, 260 both comprise the same features and functions. Therefore, the present disclosure will only describe the features of feed water valve assembly 258; however, it is understood that this description similarly describes the features of feed water valve assembly 260. As shown in FIG. 4, the feed water valve assembly 258 may include an inlet end 302, a central chamber 304, a connection 306 and an outlet end. The inlet end 302 is connected to feed water line 254. The feed water valve assembly 258 is connected to the feed water access port 212 via connection 306 which is in fluid communication with the central chamber 304. The outlet end is connected to high pressure feed water supply lines 262.

The feed water valve assembly 258 also includes a first pressure check valve 308 and a second pressure check valve 310. The first pressure check valve 308 is positioned between the inlet end 302 and the central chamber 304. A second pressure check valve 310 is positioned between the central chamber 304 and the outlet end. The pressure check valves 308, 310 generally both comprise the same features and function, therefore the present disclosure will describe the first pressure check valve 308 and it is understood that this described is inclusive of the second pressure check valve 310.

The first pressure check valve 308 includes a valve piston 312 and a valve seat 314. The valve piston 312 actuates between a closed position, when the valve piston 312 is in direct contact with the valve seat 314 and an open position where the valve piston 312 is not in contact with the valve seat 314. The valve piston 312 actuates between these two positions in response to the greater of a differential hydrostatic pressure acting across the valve piston 312 or a physical force, such as a biasing force. The valve seat 314 includes an extension stem 316 that extends away from the valve seat 314 terminating in an extension plate 318. A spring 320, for example a cylindrical compression spring, is positioned between the extension plate 318 and the valve seat 314 and the spring 320 provides a biasing force to physically direct the valve piston 312 against the valve seat 314 and into the closed position. The biasing force of the spring 320 is slightly greater than the hydrostatic pressure (P1) of the feed water in lines 254 and 260, as the feed water is delivered from the source. When valve piston 312 is in the closed position, there is no fluid communication between the contact surfaces of the valve piston 312 and the valve seat 314. When the valve piston 312 is displaced from the valve seat 314, for example by a differential hydrostatic pressure that is greater than the biasing force of the spring 320, a fluid path is created between the valve piston 312 and the valve seat 314.

In an optional feature, the feed water valve assemblies 258, can be made substantially of polymers that have corrosion-resistant properties, such as polyoxymethylene or polyetherimide. The ends 302, 308 include external support plates 315 that are made of rigid but not necessarily corrosion-resistant materials. Additionally, the spring 320 is made of austenitic materials, such as nickel-chromium alloys or super alloys.

In an additional optional feature, feed water access ports 212, 213 are a plurality of ports, each port with an individual feed water valve assembly 258, 260.

The Concentrate Valve body

Figure 5:
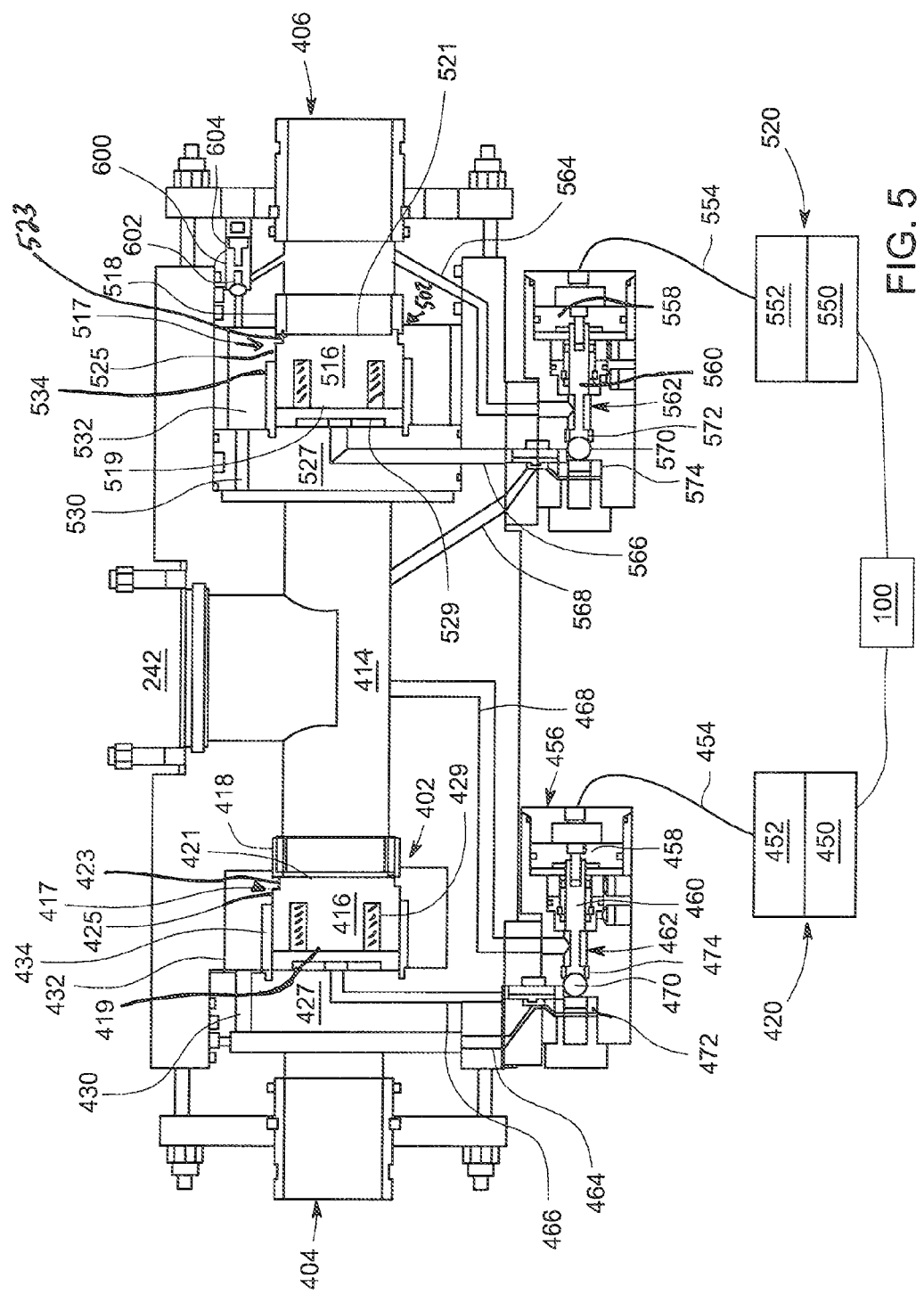
FIG. 5 is a cross-sectional, schematic view of an energy recovery valve, alternatively called a concentrate valve, used in the systems of FIG. 1.

As shown in FIG. 5, the water cylinder 200 also includes two concentrate valve bodies 400, 401, alternatively called energy recovery valves. The concentrate valve bodies 400, 401 are positioned between lines 218, 219, and the concentrate access ports 242, 244 and the respective concentrate working chambers 230, 232 and lines 250, 252 (see FIG. 1). The specific features and functions of the concentrate valve bodies 400 and 401 are the same, with the exception of the specific connections between the concentrate working chamber and the high pressure concentrate lines, as described above. Therefore the present disclosure will describe the concentrate valve body 400 and it is understood that this described is inclusive of the concentrate valve body 401.

As shown in FIG. 5, the concentrate valve body 400 includes concentrate flow control valves 402, 502 to control the flow of concentrate into and out of the concentrate working chamber 230. The concentrate valve body 400 has a first end 404, also referred to as the high pressure input end, that is in fluid communication with the high pressure concentrate line 218. The concentrate valve body 400 also has a second end 406, also referred to as the low pressure output end, that is in fluid communication with the low pressure discharge line 250. Between the two ends there is a central chamber 414 that is in fluid communication with the concentrate working chamber 230, through the lateral wall 208, via the concentrate access port 242.

The concentrate valve body 400, includes concentrate flow control valves 402, 502. The concentrate control valves 402, 502 are also referred to as the inlet valve 402 and the outlet valve 502. The inlet valve 402 is positioned between the first end 404 and the central chamber 414 of the concentrate valve body 400. The outlet valve 502 is located between the central chamber 414 and the second end 406.

The inlet valve 402 includes a manifold plate 427, an inlet valve seat 418 and an inlet valve piston 416. The manifold plate 427 is positioned between the first end 404 and the central chamber 414. The manifold plate 427 extends across the inner surface of the concentrate valve body 400 and includes a high pressure port 430 to provide fluid communication between the first end 404 and a high pressure chamber 432. The high pressure chamber 432 is located between the manifold plate 427 and the inlet valve seat 418. The inlet valve seat 418 is located between the manifold plate 427 and the central chamber 414. The inlet valve seat 418 includes a central aperture or a series of apertures so that when the inlet valve piston 416 is displaced from the inlet valve set 418, as further described below, fluid may flow from the high pressure chamber 432, past the inlet valve seat 418 into the central chamber 414.

The inlet valve piston 416 is located between the manifold plate 427 and the inlet valve seat 418. The inlet valve piston 416 has a first surface 419 that faces towards the manifold plate 427 and a second surface 421 that faces towards the inlet valve seat 418. The second surface 421 includes a stepped region 417 that establishes two effective surface areas, a central area 423 and an outer ring 425. When the second surface 421 is seated in the inlet valve seat 418, as described further below, the central area 423 is in direct contact with the inlet valve seat 418 and the outer ring 425 is recessed from the inlet valve seat 418.

The manifold plate 427 includes a manifold plate extension 434 that restricts the movement of the inlet valve piston 416 to actuate in a single plane, between an open position and a closed position. The manifold plate extension 434 extends away from the manifold plate 434, towards the central chamber 414. The manifold plate extension 434 extends around the inlet valve piston 416, thereby restricting the movement of the inlet valve piston 416 to move either towards or away from the manifold plate 427 and thereby towards or away from the inlet valve seat 418.

The high pressure chamber 432 is defined by the inner surface of the concentrate valve body 400, the manifold plate 427, the manifold plate extension 434 and at least partially by the inlet valve piston 416, as will be discussed further below. Via the high pressure port 430, the manifold plate 427 isolates the first surface 419 of the inlet valve piston 416 from the high pressure concentrate fluid flow that enters the concentrate valve body 400 from the first end 404.

Optionally, an inlet spring 429, for example a compression spring, can be positioned between and in contact with the manifold plate 427 and the first surface 419 of the inlet valve piston 416. The inlet spring 429 provides a physical biasing force that directs the inlet valve piston 416 towards the inlet valve seat 418.

The inlet valve piston 416 is moveable, within the confines of the manifold plate extension 434, to position the second surface 421 of the inlet valve piston 416 in direct contact with the inlet seat 418, this is referred to as the closed position. When the inlet valve 402 is in the closed position, there is no fluid communication between the inlet valve piston 416 and the inlet valve seat 418 and therefore there is no fluid communication between the first end 404 and the central chamber 414. Further, when the inlet valve piston 416 is in the closed position it contributes to defining the high pressure chamber 432 (as shown in FIG. 5). When the inlet valve piston 416 is in the closed position, the inlet fluid path between the first end 404 and the central chamber 414 terminates in the high pressure chamber 432.

The inlet valve piston 416 is also moveable to position the second surface 421 away from the inlet seat 418, this is referred to as the open position. When the inlet valve piston 416 is in the open position, the inlet fluid flow path is open between the inlet valve piston 416 and the inlet valve seat 418. This inlet fluid flow path provides fluid communication from the first end 404 to the central chamber 414 and ultimately into the concentrate working chamber 230. When the inlet valve piston 416 is in the open position it contributes only partially to defining the high pressure chamber 432 because the inlet fluid path is open between the inlet valve piston 416 and the inlet valve seat 418. When the inlet valve piston 416 is in the open position, an inlet fluid path between the first end 404 and the central chamber passes through the high pressure chamber 432.

The inlet valve 402 includes an inlet valve actuator 420 that responds to instructions from the control unit 100. Instructions from the control unit 100 cause the inlet valve piston 416 to actuate between the open position and the closed position.

The inlet valve actuator 420 includes a solenoid 450 that responds to electrical signals from the control unit 100. Based upon the electrical signals received from the control unit 100, the solenoid 450 can activate thereby connecting an air compressor 452 to an air line 454. The air line 454 is connected to one end of a pilot valve body 456. The solenoid 450 can also de-activate thereby connecting the air line 454 to a vent port (not shown) of the solenoid valve 450. The pilot valve body 456 includes a pilot valve piston 458, which has one piston face that faces the pressurized air line 454. The pilot valve piston 458 also has an opposite piston face that is connected to a pilot valve stem 460. The pilot valve stem 460 extends away from the pilot valve piston 458. The pilot valve stem 460 extends away from the pilot valve piston 458 through a pilot valve chamber 462. The pilot valve stem 460 can move within the pilot valve chamber 462 without creating any pressure or fluid seals therein.

Three separate channels branch off of the pilot valve chamber 462: a first pilot chamber 464; a second pilot chamber 466; and a third pilot chamber 468. The first pilot chamber 464 is connected to the first end 404 to provide fluid communication between the first end 404 and the pilot valve chamber 462. The second pilot chamber 466 is connected between the pilot valve chamber 462 and the first surface 419 of the inlet valve piston 416. The second pilot chamber 466 can extend through the manifold plate 427 to provide fluid communication between the first surface 419 of the inlet valve piston 416 and the pilot valve chamber 462. The third pilot chamber 468 is connected between the pilot valve chamber 462 and the central chamber 414, providing fluid communication therebetween.

The pilot valve chamber 462 also includes a pilot ball valve 470, an inlet pilot ball valve seat 472 and an outlet ball valve seat 474. The pilot ball valve 470 can move between an inlet position and an outlet position. When the pilot ball valve 470 is seated in the inlet pilot ball valve seat 472, this is referred to as the inlet position. When the pilot ball valve 470 is seated in the outlet pilot ball valve seat 474, this is referred to as the outlet position. In FIG. 5, the pilot ball valve 470 is shown in the outlet position.

When the pilot ball valve 470 is in the inlet position, there is no fluid communication between the first pilot chamber 464 and the second pilot chamber 466. When the pilot ball valve 470 is in the inlet position there is fluid communication between the second pilot chamber 466 and the third pilot chamber 468.

When the pilot ball valve 470 is in the outlet position, there is fluid communication between the first pilot chamber 464 and the second pilot chamber 466. When the pilot ball valve 470 is in the outlet position, a fluid path is opened from the first end 404, through the first pilot chamber 464 the second pilot chamber 466 to the first surface 419 of the inlet valve piston 416. Pressurized concentrate that follows this fluid path causes the inlet valve piston 416 to move into direct contact with the inlet valve seat 418, the closed position.

The outlet valve 502 is located within the concentrate valve body 400, between the second end 406 and the central chamber 414. The outlet valve 502 includes a manifold plate 527, an outlet valve seat 518 and an outlet valve piston 516. The manifold plate 527 is positioned between the second end 406 and the central chamber 414. The manifold plate 527 extends across the inner surface of the concentrate valve body 400 and includes a flow port 530 that provides fluid communication between the central chamber 414 and a pressure chamber 532. The pressure chamber 532 is located between the manifold plate 527 and the outlet valve seat 518. The outlet valve seat 518 is located between the manifold plate 527 and the second end 406. The outlet valve seat 518 is smaller in cross-section than the outlet valve piston 516. The outlet valve seat 518 includes a central aperture or a series of apertures so that when the outlet valve piston 516 is displaced from the outlet valve set 518, as further described below, fluid may flow from the high pressure chamber 532, past the inlet valve seat 518 towards the second end 406.

The outlet valve piston 516 is located between the manifold plate 527 and the outlet valve seat 418. The outlet valve piston 516 has a first surface 519 that faces towards the manifold plate 527 and a second surface 521 that faces towards the outlet valve seat 518. The second surface 521 includes a stepped region 517 that establishes two effective surface areas, a central area 523 and an outer ring 525. When the second surface 521 is seated in the outlet valve seat 518, as described further below, the central area 523 is in direct contact with the outlet valve seat t18 and the outer ring 525 is recessed from the outlet valve seat 518.

The movement of the outlet valve piston 516 is restricted by a manifold plate extension 534 to actuation in a single plane, between an open position and a closed position. The manifold plate extension 534 extends away from the manifold plate 534, towards the second end 406 and the manifold plate extension 534 extends around the outlet valve piston 516. The manifold plate extension 534 restricts the movement of the outlet valve piston 516 to move either towards or away from the manifold plate 527 and thereby towards or away from the outlet valve seat 518.

The pressure chamber 532 is defined by the inner surface of the concentrate valve body 400, the manifold plate 527, the manifold plate extension 534 and at least partially by the outlet valve piston 516, as will be discussed further below. The manifold plate 527 isolates the first surface 519 of the outlet valve piston 516 from the concentrate fluid flow within the central chamber 414.

Optionally, an outlet spring 529, for example a cylindrical compression spring, may be placed in contact with the manifold plate 527 and the first surface 521 of the outlet valve piston 516. The outlet spring 529 provides a physical biasing force that drives the outlet valve piston 516 towards the outlet valve seat 518.

The outlet valve piston 516 is moveable, within the confines of the manifold plate extension 534 to position the second surface 521 of the outlet valve piston 516 in direct contact with the outlet seat 518, this is referred to as the closed position. When the outlet valve 274 is in the closed position, there is no fluid communication between the outlet valve piston 516 and the outlet valve seat 518. When the outlet piston 516 is in the closed position there is no fluid communication between the central chamber 414 and the second end 406. When the outlet valve piston 516 is in the closed position it contributes to defining the pressure chamber 532 (as shown in FIG. 5). Therefore, when the outlet valve piston 516 is in the closed position, an outlet fluid path between the central chamber 414 and the second end 406 terminates in the pressure chamber 532.

The outlet valve piston 516 is moveable to position the second surface 521 away from the outlet seat 518, this is referred to as the open position. When the outlet valve piston 516 is in the open position, the outlet fluid flow path is established between the outlet valve piston 516 and the outlet valve seat 518. This outlet fluid flow path provides fluid communication from the central chamber 414 to the second end 406 and ultimately to line 250 for waste or recycling. When the outlet valve piston 516 is in the open position it partially contributes to defining the pressure chamber 532 because the outlet fluid path is now open between the outlet valve piston 516 and the outlet valve seat 518 and the pressure chamber 532 is fluid communication with the second end 406. Therefore, when the outlet valve piston 516 is in the open position, an outlet fluid path between the central chamber 414 passes through the pressure chamber 532.

The outlet valve 502 includes an outlet valve actuator 520 that responds to instructions from the control unit 100. Instructions from the control unit 100 cause the outlet valve piston 516 to actuate between the open position and the closed position.

The outlet valve actuator 520 includes a solenoid 550 that responds to electrical signals from the control unit 100. Based upon the electrical signals received from the control unit 100, the solenoid 550 can activate thereby connecting an air compressor 552 to an air line 554. The air line 554 is connected to one end of an outlet pilot valve body 556. The solenoid 550 can also de-activate thereby connecting the air line 554 to a vent port (not shown) of the solenoid valve 550. The outlet pilot valve body 556 includes an outlet pilot valve piston 558, which has one piston face that faces the pressurized air line 554. The pilot valve piston 558 also has an opposite piston face that is connected to a outlet pilot valve stem 560. The outlet pilot valve stem 560 extends away from the outlet pilot valve piston 558. The outlet pilot valve stem 560 extends away from the outlet pilot valve piston 558 through an outlet pilot valve chamber 562. The outlet pilot valve stem 560 can move within the outlet pilot valve chamber 562 without creating any pressure or fluid seals therein.

Three separate channels branch off of the outlet pilot valve chamber 562: a first outlet pilot chamber 568; at second outlet pilot chamber 566; and a third outlet pilot chamber 564.

The first outlet pilot chamber 568 is connected between the pilot valve chamber 562 and the central chamber 414, providing fluid communication therebetween. The second outlet pilot chamber 566 is connected between and the first surface 519 of the outlet valve piston 516. The second outlet pilot chamber 566 can extend through the manifold plate 527. The second outlet pilot chamber 566 establishes fluid communication between the first surface 519 of the outlet valve piston 516 and the outlet pilot valve chamber 562. The third outlet pilot chamber 564 is connected between the second end 406 and the outlet pilot valve chamber 562 to establish fluid communication therebetween.

The pilot valve chamber 562 also includes an outlet pilot ball valve 570, an inlet pilot ball valve seat 572 and an outlet ball valve seat 574. The outlet pilot ball valve 570 can be seated in the inlet pilot ball valve seat 572, referred to as the inlet position. The outlet pilot ball valve 570 can also be seated in the outlet pilot ball valve seat 574, referred to as the outlet position.

When the outlet pilot ball valve 570 is in the inlet position, there is fluid communication between the central chamber 414 and the first surface 519 of the outlet valve piston 516. When the outlet pilot ball valve 570 is in the inlet position, there is no fluid communication between the second pilot chamber 566 and the third outlet pilot chamber 564 and the outlet valve piston 516 is in the closed position.

When the outlet pilot ball valve 570 is in the outlet position, there is no fluid communication between the central chamber 414 and either of the second outlet pilot chamber 566 or the third outlet pilot chamber 564. When the outlet pilot ball valve 570 is in the outlet position fluid communication is established between the second outlet pilot chamber 566 and the third outlet pilot chamber 564. When the outlet pilot ball valve 570 is in the outlet position, the outlet valve piston 516 is in the open position. When the outlet valve piston 516 is in the open position an outlet fluid passage is provided from the central chamber 414 to the second end 406 through the discharge flow port 530 and the pressure chamber 532.

In an optional feature of the concentrate valve body 400, the concentrate valve body 400 can be made substantially of polymers that have corrosion-resistant properties, such as polyoxymethylene or polyetherimide. The ends 404, 406 can include external support plates 316 that are made of rigid corrosion-resistant materials, such SS316 stainless steel. Additionally, the inlet spring 429 and the outlet spring 529 can be made of austenitic materials, such as nickel-chromium alloys or super alloys. The inlet valve piston 416 and the outlet valve piston 516 are made of polymers that have corrosion-resistant properties, such as polyoxymethylene or polyetherimide. The inlet valve seat 418 and the outlet valve seat 518 can be made of austenitic materials, such as AL6XN stainless steel.

In an additional optional feature of the concentrate valve body 400, the pressure chamber 532 includes a pressure relief system 600. The pressure relief system 600 includes an outlet pressure relief valve 602 and an outlet pressure relief chamber 604. The outlet pressure relief valve 602 is positioned between the pressure chamber 532 and the outlet end 406, as shown in FIG. 5. The outlet pressure relief chamber 604 provides fluid communication between the pressure chamber 532 and the outlet end 406. The outlet pressure relief valve 602 can be any type of known pressure relief valve that will actuate when the pressure within the pressure chamber 532 increases beyond a set point, for example 500 to 1000 p.s.i. Actuation of the outlet pressure relief valve 602 will allow fluid communication from the pressure chamber 532 to the outlet end 406.

In an additional optional feature, the pilot valve bodies 456, 556 includes a spring (not shown) that provides a biasing force to physically direct the pilot valve pistons 458, 558 away from the pilot ball valves 470, 570. The pilot valve stems 460, 560 will similarly move away from the pilot ball valves under this biasing force. The biasing force of this spring is lower than the air pressure delivered by the lines 454, 554, for example 100 p.s.i. so that this spring will only physically move the pilot valve pistons 458, 558 when there is no air pressure delivered to the piston face.

The Control Unit

The control unit 100 is a multi-processor based computing system that has one or more processors or microprocessors, micro-computers and Field Programmable Gate Arrays that execute control code and programs to control and monitor the system 10. The control unit 100 controls and monitors the hydraulic output of the hydraulic pump 12. The control unit 100 also controls and monitors information regarding the position of the reciprocating assembly 300 from an inner feedback loop 108 and an outer feedback loop 120.

The control unit 100 executes various programs to control the hydraulic output of the hydraulic pump 12 and thereby regulating the velocity and position of the reciprocating assembly 300 in accordance with a timing protocol 130, also referred to as a velocity profile. The timing protocol 130 is a series of algorithms that are stored in the non-volatile memory of the control unit 100. The control unit 100 sends output commands to the hydraulic pump 12 to alter the angle of the swash plate 70, which regulates the hydraulic output of the hydraulic pump 12, also based upon the timing protocol 130.

The timing protocol 130 includes two features, the first feature defines the desired position of the reciprocating assembly 300 by an assembly sequence 132. The second feature of the timing protocol 130 coordinates the opening and closing of the concentrate valve bodies 400, 401 by a sequence defined by a valve sequence 134. The assembly sequence 132 and the valve sequence 134 are coordinated by the control unit 100 to ensure that the movement of each reciprocating assembly 300 is coordinated with the movement of the other reciprocating assemblies 300 to ensure that a constant flow of high pressure feed water is delivered to the desalination process 316. Furthermore, the assembly sequence 132 and the valve sequence 134 are coordinated by the control unit 100 to ensure that the correct concentrate valve bodies 400, 401 are properly actuated to allow the flow of high pressure concentrate into and out of the concentrate working chambers 230 and 232 at the correct time to ensure the greatest efficiency of energy recovery in the movement of the reciprocating assembly 300.

Pursuant to the assembly sequence 132, the control unit 100 regulates the hydraulic output of the hydraulic pump 12 and thereby the position of the reciprocating assembly 300.

Figure 6:
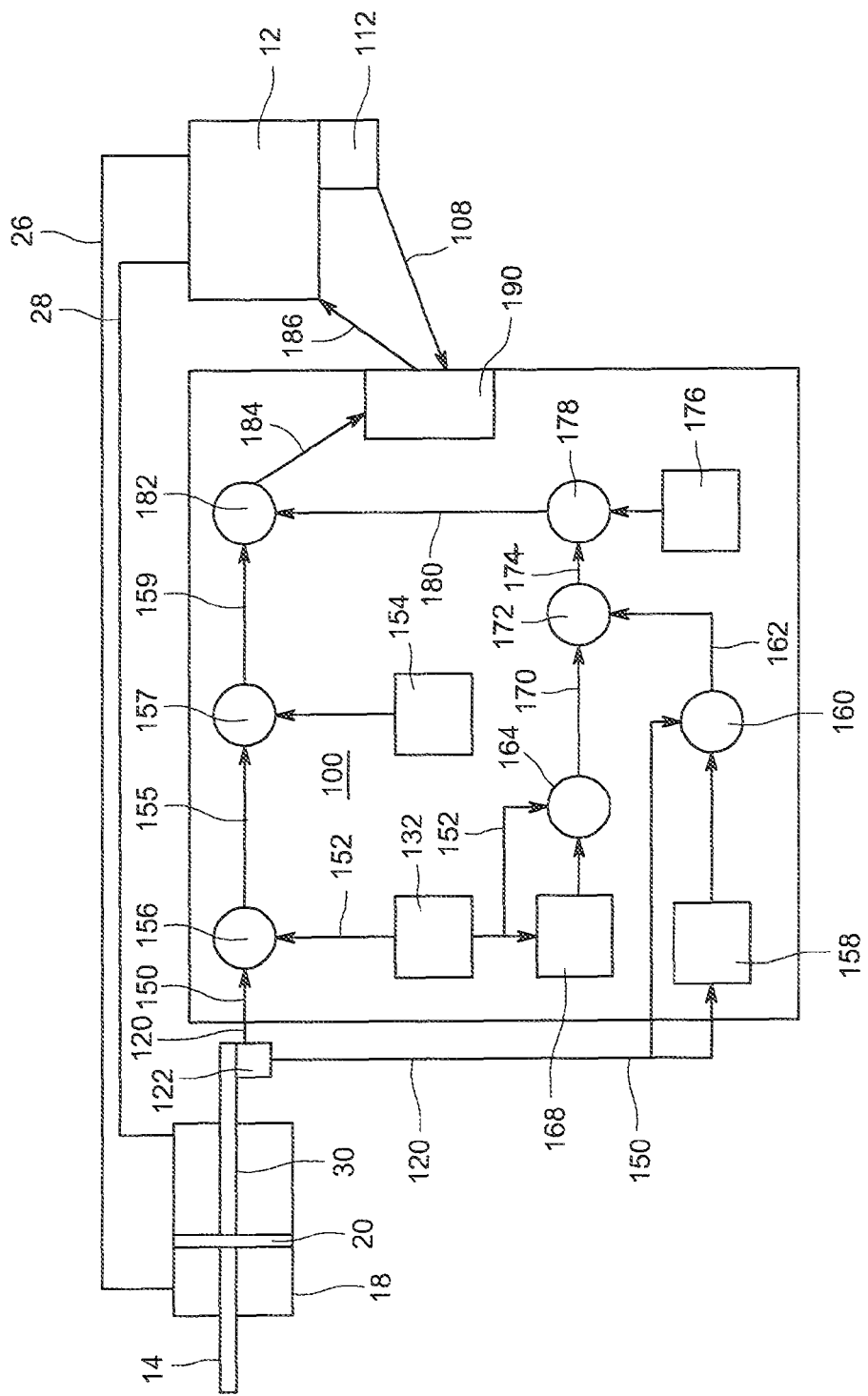
FIG. 6 is a schematic of inner and outer feedback loops of a control unit used in the systems of FIG. 1.

To aid in moving the reciprocating assembly 300 within the parameters of the assembly sequence 132, the control unit 100 receives information from an inner feedback loop 108 and an outer feedback loop 120, as shown in FIG. 6. The inner feedback loop 108 includes a sensor 112, that indirectly senses the rate and direction of hydraulic output of the hydraulic pump 12. Optionally, the sensor 112 can measure the angle of the swash plate 70 when using a hydraulic transmission that is operating at a constant rotational speed. In this option, the sensor 112 can be a rotational potentiometer that measures the angle between the swash plate 70 and the input shaft 60 of the hydraulic pump 12. The sensor 112 is realized using any suitable sensor, as is known in the art, to provide the detected angular information to the control unit 100 by way of an electronic signal, for example a change in voltage, current and the like.

Upon receipt of the angular information from the sensor 112, the control unit 100 determines the required hydraulic output of the hydraulic pump 12 to ensure that the reciprocating assembly 300 is moving according to the assembly sequence 132.

For example, the control unit 100 receives the angular information from the inner feedback loop to determine whether the swash plate 70 is in the correct angular position to provide the correct hydraulic output within a given timeframe by comparison to the assembly sequence 132 velocity profile algorithm. For example, if the hydraulic output of the hydraulic pump unit 12 is incorrect, by incorrect it is meant that the hydraulic output of the hydraulic pump 12 is providing either too much or too little hydraulic output to match the assembly sequence 132, the angle of the swash plate 70 may be changed, either inclined or declined, to correct the hydraulic output of the hydraulic pump 12. The relationship between the angle of the swash plate 70 and the hydraulic output of the hydraulic pump 12 is calibrated and saved in the memory of the control unit 100.

The control unit 100 also receives information from an outer feedback loop 120. The outer feedback loop 120 includes a second sensor schematically represented as sensor 122 in FIG. 6, that senses, either directly or indirectly, the position of the piston rod 14 and thereby the position of the reciprocating assembly 300. For example, sensor 122 is a position sensor that provides positional information to the control unit 100 regarding the location of the piston rod 14. As depicted in FIG. 6, the position sensor 122 may be positioned adjacent rod 30, which is connected to the piston rod 14 and extends from a back end of the hydraulic cylinder 18. However, this positioning is only exemplary, as such, the position sensor 122 could be positioned at any location along rods 14, the reciprocating assembly 300 or elsewhere. The position sensor may be realized using any suitable linear, position sensor as is known in the art, such as a linear variable differential transformer sensor to provide the actual linear position of the piston rod 14 to the control unit 100 by way of an electronic signal, for example a change in voltage, current and the like.

Co-Ordination Process

In operation, the system 10 achieves the highest energy efficiency and avoids pressure build-ups by using the control unit 100 to co-ordinate the movement of the reciprocating assembly 300 with the actuation of the concentrate valve bodies 400, 401.

The positional information of the outer feedback loop 120, provided by the sensor 122 is directed to the control unit 100. The positional information is regularly provided, for example every 0.1 to 10 ms, more specifically every 1 to 2 ms, and the control unit 100 compares this actual positional information, referred to as the actual position value, with an ideal position value 152 of the reciprocating assembly 300, as determined by the assembly sequence 132. The control unit 100 uses a subtractor 156 to subtract the actual position value 150 from the ideal position value 152 to produce a first difference value 155. A multiplier 157 multiplies the first difference value 155 by a gain factor Ka 154 to produce a first multiplied value 159. The gain factor Ka 154 is determined by an initial calibration and aliment procedure to insure proper functionality of the system without excessive overshoot or undershoot of the reciprocating assembly position. The current position value 150 is also stored by the electronic controller unit 100 and it is compared to the previous position value 158 of the reciprocating assembly 300 from the previous 1 ms sample. Using a subtractor 160, the control unit 100 subtracts the current position 150 from the previous position 158 and the known 1 ms sample window to control unit 100 calculates an actual velocity value 162. A substractor 164 subtracts the current ideal position value 152 and the ideal position value 168 for the previous 1 ms to calculate an ideal velocity value 170. A subtractor 172 subtracts the actual velocity value 162 from the ideal velocity value 170 to generate a second difference value 174. A multiplier 178 multiplies the difference value 174 by the gain factor Kv 176 to produce a second multiplied value 180. The gain factor Kv 176 is determined by an initial calibration and alignment procedure to insure proper functionality of the system without excessive overshoot or undershoot. The first multiplied value 159 and the second multiplied value 180, are summed, by an adder 182 to generate a sum value 184. The sum value 184 can be either positive or negative. If the sum value 184 is positive then the control unit 100 will send a swash plate command 186 to the hydraulic pump 12 to cause the angle of the swash plate 70 to change so that the hydraulic output of the hydraulic pump 12 causes the reciprocating assembly 300 to move in the first direction. If the sum value 184 is negative, then a subordinate controller 190 will send a swash plate command 186 that causes the angle of the swash plate 70 to change so that the hydraulic output of the hydraulic pump 12, which in turn causes the reciprocating assembly 300 to move in the second direction.

The swash plate angular information from the sensor 112 provides information regarding the hydraulic output of the hydraulic pump 12 to the subordinate controller 190 of the control unit 100. The control unit 100 uses this angular information to expedite the movement of the swash plate 70 to the position as determined by the control unit 100 output commands 186. This inner control loop 108 provides greater acceleration of the movement of the swash plate 70 to increase the responsiveness of the hydraulic pump 12 to commands from the control unit 100.

Each reciprocating assembly 300 operates in a closed loop manner with the hydraulic pump 12. Therefore the movement, i.e., acceleration, constant velocity, and deceleration, of the reciprocating assembly 300 can be controlled, by precise control of the hydraulic output of the hydraulic pump 12, to reproduce the assembly sequence 132.

Figure 7:
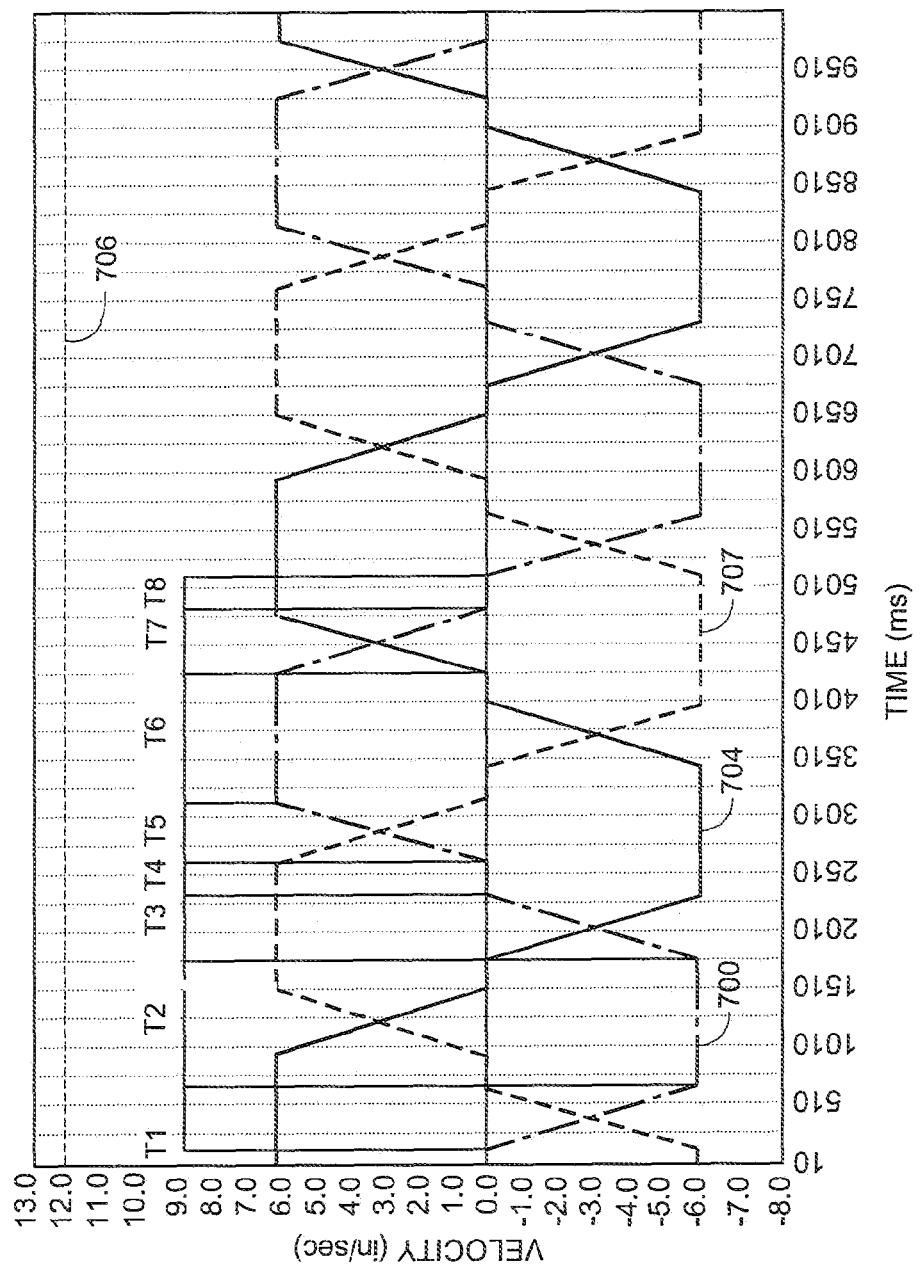
FIG. 7 is a velocity vs. time profile used in operating the systems of FIG. 1.

An example assembly sequence 132 is depicted in FIG. 7 where a 1 second example of a reciprocating assembly pumping cycle is illustrated. The small dotted line 700 represents the velocity over time of a first reciprocating assembly 300. The hashed line 702 represents the velocity over time of a second reciprocating assembly 300'. The solid line 704 represents the velocity over time of a third reciprocating assembly 300".

Focusing on the first reciprocating assembly 300, at time 10 ms, the first reciprocating assembly 300' is in a fully extended position, at the end of moving in the first direction. The pump cycle starts with a stroke in the second direction during which the reciprocating assembly 300 is linearly accelerated from rest (zero velocity) up to a velocity (−V), for example −6 in/sec for a time period T1. Then, the velocity −V is maintained for a time period T2 (a constant velocity period) as the reciprocating assembly 300 continues its stroke in the second direction. As the reciprocating assembly 300 approaches the end of the stroke in the second direction, a deceleration period T3 begins, during which the reciprocating assembly 300 decelerates from velocity −V to zero. Once the reciprocating assembly 300 is stopped, at the conclusion of moving in the second direction, it remains stopped for a short dwell time T4. The short dwell time T4 may last, for example 200 ms. As the reciprocating assembly 300 begins a stroke in the first direction the reciprocating assembly 300 is linearly accelerated in the first direction to a velocity (V), for example 6 in/sec for a time period T5. The velocity V is then maintained for a time period T6 (a constant velocity period) as the reciprocating assembly 300 continues its backward stroke. As the reciprocating assembly 300 approaches the end of this stroke, a deceleration period T7 begins during which the reciprocating assembly 300 decelerates from velocity V to zero. Once the reciprocating assembly 300 is stopped, at the conclusion of the backward stroke, it remains stopped for a second short dwell time T8.

As described above, the movement of the reciprocating assembly 300 is determined by the signals provided by the control unit 100 to move three individual reciprocating assemblies 300, 300' and 300" in accordance with the assembly sequence 132 to generate a high pressure and constant delivery of feed water to the RO membrane unit 216, which is represented by the line 706, which is the absolute velocity sum of the three reciprocating assemblies. To provide such a high pressure at a constant rate, the three reciprocating assemblies 300, 300' and 300" are 120 degrees out of phase from each other.

To facilitate the flow of feed water and concentrate through the various chambers of the water cylinder 200, the actuation of the feed water valve assemblies 258, 260 and the concentrate valve bodies 400, 401 is coordinated with the movement of the reciprocating assembly 300.

In an optional feature, the system 10 includes more than 3 hydraulic pumps 12, water cylinders 200 and more than 3 reciprocating assemblies 300. If X represents the number of reciprocating assemblies then 360/X is the number of degrees that the reciprocating assemblies 300 are out of phase from each other. For example, if there are 12 hydraulic pumps, 12 water cylinders 200 and 12 reciprocating assemblies 300, then the movement of the reciprocating assemblies 300 will be 30 degrees (360/12) out of phase from each other to provide a constant delivery of high pressure feed water to the RO membrane unit 216.

Feed Water Valves

As the reciprocating assembly complex 300 moves in a first direction, the feed water working chamber 228 will decrease in volume. To prevent a build up of pressure the feed water within chamber 228 must be discharged through outlet 212 by the actuation of the feed water valve assembly 258. As the volume of the feed water working chamber 228 decreases, the pressure therein increases, as does the pressure within the central chamber 304 of the feed water valve assembly 258. This increase in pressure will cause the first pressure check valve 308 to close because the pressure within the central chamber is P2 which is greater than the pressure P1 which is acting on the inlet side of the piston 312. This causes the closure of the first pressure check valve 308 and ensures against a back flow of feed water into line 254. The increase of pressure within the central chamber 304 of the feed water valve assembly 258 will cause the second pressure check valve 310 to open. The pressure differential across the face of the valve piston 312 is caused by P2 in the central chamber 304 and the lower pressure at the outlet end 308. This differential pressure overcomes the biasing force of the spring 316, such that the valve piston 312 displaces from the valve seat 314 and a fluid from inside the feed water working chamber 228 can exit, pass through the central chamber 304, through the second pressure check valve, out the outlet 314 and along line 262 to the RO membrane unit 216 maintaining substantially a pressure of P2.

As feed water is discharged from the feed water working chamber 228, by the movement of the reciprocating assembly 300 in the first direction, the volume of the feed water working chamber 234 increases. This causes the pressure within the central chamber 304 of feed water valve assembly 260 to decrease. This decrease in pressure within the feed water working chamber 234 also occurs in the central chamber 304. This decreased pressure causes the first pressure check valve 312 to move to the open position because the differential pressure between the central chamber 304 and the inlet end 302 overcomes the biasing force of the spring 312. When the biasing force of spring 320 is overcome by the differential pressure, the valve piston 312 is displaced from the valve seat 314 which creates a flow path for feed water to enter into chamber 234 from the source 216.

Concentrate Flow Control Valve

High pressure concentrate may periodically enter the valve body 400 via the inlet 404, this is referred to as the inlet phase. The high pressure concentrate enters the valve body 427 and flows around the manifold plate 427 and enters the high pressure chamber 432. At the onset of the inlet phase, the inlet valve piston 416 is in the closed position and the pilot ball valve 470 is in the outlet position. The flow of high pressure concentrate into the high pressure chamber 432 acts on the outer ring 425 of the inlet valve piston 416. The hydrostatic pressure in the central chamber 414 and the second pilot chamber 466 will equalize due to the movement of the pilot ball valve 470 to the inlet position. Therefore the hydrostatic pressure acting on the first surface 419 of the inlet valve piston 416 is the same as the hydrostatic pressure within the central chamber 414. At the beginning of the inlet phase, the hydrostatic pressure within the central chamber 414 is lower than the hydrostatic pressure of the high pressure concentrate within the high pressure chamber 432. Therefore, the hydrostatic pressure acting upon the outer ring 425 is greater than the pressure acting on the first surface 419 of the inlet valve piston 416. This pressure differential causes the inlet piston valve 416 to move to the open position.

As the high pressure concentrate flows through the area of inlet valve seat 418, turbulence can occur can cause head loss.

Due to this head loss, even when the inlet valve piston 416 is in the open position, the hydrostatic pressure within the central chamber 414 is less than the hydrostatic pressure within the high pressure chamber 432. The outer ring 425 is positioned upstream of at least a substantial portion of the head loss, due to being recessed from the central area 423. Therefore, the pressure acting upon the outer ring 425 remains greater than the pressure within the central chamber 414. Further, the hydrostatic pressure acting upon the outer ring is greater than the physical biasing force of the inlet spring 429. The flow of high pressure concentrate from the high pressure chamber 432 into the central chamber 414 allows the inlet valve piston 416 to remain in the open.

During the inlet phase the control unit 100 sends electrical signals to the electronically controlled actuators 420, 520 of the concentrate valve bodies 400, 401. As described above, both of the inlet actuator 420 and the outlet actuator 520 are responsive to electrical signals, for example a change in voltage, current and the like, from the electronic controller unit 100. In response to instructions from the control unit 100, the concentrate valve body 400 actuates, for example the position of the pilot ball valve 470 and the outlet pilot ball valve 570 can change from the outlet position to the inlet position.

During the inlet phase the control unit 100 sends electric signals to the inlet valve actuator 420. The inlet valve actuator 420 actuates the solenoid 450 to cause the inlet air compressor 452 to act on the pilot valve piston 458. The air pressure on the pilot valve piston 458 causes the pilot valve stem 460 to direct the pilot ball valve 470 into the inlet position.

The hydrostatic force of the high pressure concentrate within the second pilot chamber 466 and the physical biasing force of the inlet spring 429 both act upon the first surface 419 of the inlet valve piston 416. When the pilot ball valve 470 is in the inlet position, the second pilot chamber 466 is in fluid communication with the pilot valve chamber 466 and the third pilot chamber 468. This fluid communication allows any concentrate fluids within the second pilot chamber 466 to flow into the central chamber 414.

The movement of the pilot ball valve 470 equilibrates the hydrostatic forces acting on the first surface 419 with the static pressure within the central chamber 414.

During the inlet phase, the outlet valve piston 516 is in the closed position which directs the high pressure concentrate entering the central chamber 414 will enter the port 242.

During the inlet phase, the high pressure concentrate will flow through the central chamber 414 to enter the first outlet pilot chamber 568 and the outlet pilot valve chamber 542 and direct the outlet ball valve 570 to sit in the inlet pilot ball valve seat 572, the inlet position. During the inlet phase, the control unit 100 decreases the pressure acting upon the outlet pilot valve piston 558. Therefore, the outlet pilot valve stem 560 does not act upon the outlet pilot ball valve 570, against the high pressure concentrate within the outlet pilot valve chamber 542.

When the outlet ball valve 570 is in the inlet position, there is fluid communication between the third pilot chamber 568 and the second outlet pilot chamber 566 so that the high pressure concentrate flows from the central chamber 414 into the second outlet pilot chamber 566 to act upon the first surface 519 of the outlet valve piston 516. During the inlet phase, the high pressure concentrate also flows around the manifold plate 527, through the flow port 530 and into the pressure chamber 532. The combined pressure of the high pressure concentrate on the first surface 519 and the outlet spring 529 is greater than the force of the high pressure concentrated upon the outer ring 525 and the outlet valve piston 516 is in the closed position. As described above, if the outlet valve piston 516 is in the closed position, then there is no fluid communication provided between the pressure chamber 532 and the outlet end of the concentrate valve body 400.

Periodically, the valve body 400 can experience an outlet phase. During the outlet phase there is little to no flow of high pressure concentrate entering the valve body 400 at the inlet 404. Further, there is a flow of fluid from the port 242 into the central chamber 414. The little or no flow of high pressure concentrate within the high pressure chamber 432 allows the inlet valve piston 416 to move to the closed position.

During the outlet phase, the outlet valve piston 516 can open in a manner similar to the inlet valve piston 416 during the inlet phase. The flow of concentrate from the central chamber into the pressure chamber 532 will act upon the outer ring of the outlet valve piston 516. This flow of concentrate has a higher hydrostatic pressure than the pressure within the outlet 406 and the hydrostatic pressure action upon the first surface 519. Therefore, the outlet valve piston 516 moves to the open position. Similarly, the flow of concentrate through the area of the outlet valve seat 518 will experience a head loss. The positioning of the outer ring 525 upstream of at least a substantial portion of the head loss allows the outlet valve piston to remain open during constant flow of concentrate from the central chamber 414 to the outlet 406.

During the outlet phase, the control unit 100 can send electric signals to allow the discharge or outlet of the concentrate from the central chamber 414.

Under instruction from the control unit 100, the air compressor 450 does not provide any air pressure through line 454 to act upon the inlet pilot valve piston 458 and the pilot ball valve 470 is directed to the outlet position. When the pilot ball valve 470 is in the outlet position, there is fluid communication between the first pilot chamber 464 and the second pilot chamber 466. When the inlet valve piston 416 is in the closed position there is no fluid communication between the high pressure chamber 432 and the central chamber 414 and there is no flow of high pressure concentrate from the inlet end 404 into the central chamber 414.

During the outlet phase, the control unit 100 causes the outlet actuator 520 to provide pressure to the face of the outlet pilot valve piston 538, which causes the outlet pilot valve stem 560 to physically direct the outlet pilot ball valve 570 into the outlet pilot valve seat 574, the outlet position. The physical force of the outlet pilot valve stem 560 directing the outlet pilot ball valve 570 into the outlet position is greater than the hydrostatic pressure of the concentrate as it exits the port 242 and acts upon the outlet pilot ball valve 570 via the third pilot chamber 564. While the outlet pilot ball valve 570 is in the outlet position, the second outlet pilot chamber 566 is in fluid communication with the third outlet pilot chamber 564. The hydrostatic pressure of the concentrate within the pressure chamber 532 acting upon the outer ring 525 of the outlet valve piston 516 is greater than the total amount of force acting on the first surface 519, the outlet valve piston 516 is displaced from the outlet valve seat 518 and the concentrate exiting the concentrate working chamber 232 flows from the central chamber 414 to the outlet end 406 of the concentrate valve body 400.

As the reciprocating assembly 300 moves in the second direction, opposite to the first direction the actuation of the feed water valve bodies 258, 260 and the concentrate valve bodies 400, 401 must be reversed. In that the feed water valve body 258 will actuate, in response to the changes in pressure, to allow the flow of feed water from the source 110 into the feed water working chamber 228 and the feed water valve body 260 will actuate to allow feed water to exit the feed water working chamber 232.

During the movement of the reciprocating member 300 in the second direction, the volume of concentrate working chamber 230 decreases and the control unit 100 will cause the concentrate valve body 400 to actuate into the discharge mode, as described hereinabove. Further, the volume of the concentrate working chamber 232 increases and the electrical control unit 100 will cause the concentrate valve body 401 to actuate into the inlet mode, as described herein above.

It is through the coordination of the movement of the reciprocating assemblies 300, 300' and 300" that a constant flow of high pressure feed water (P2) is delivered to the RO membrane unit 216. Further, it is through the coordinated delivery of the high pressure concentrate (P3) to the concentrate working chambers 230, 232 that the energy of the high pressure concentrate can assist in the movement of the reciprocating assembly 300 and thereby decrease the required work of the hydraulic pump 12. For example, the flow of high pressure concentrate into the concentrate working chamber 230 assists in the movement of the reciprocating assembly 300 in the first direction by acting against the back face 238 of dual-action piston 224, which will provide energy to assist in the movement of the reciprocating assembly 300. Similarly, the introduction of high pressure concentrate into the concentrate working chamber 232 during the movement of the reciprocating assembly 300 in the second direction is assisted by the high pressure concentrate acting upon the concentrate face 240 of dual-action piston 226.

The coordination of the assembly sequence 132 with the valve sequence 134 can occur such that both of the inlet piston 416 and the outlet piston 516 of both concentrate valve bodies 400, 401 are closed at the same time during the dwell period referred to as a simultaneous piston closure.

The control unit 100 may, by the coordination of the assembly sequence 132 and the valve sequence 134, effectively count, for example 50 or X/3 milliseconds, from when the reciprocating assembly 300 stops moving, i.e. has a velocity of zero, and enters into a dwell period (see T4 and T8 for line 700 in FIG. 7). If the dwell period is set to be X ms long, then the electronic controller will count X/3 ms from the start of the dwell period, or (X/3−the time to actuate) from the start of the dwell period. At the end of the first X/3 ms the electronic control unit will send electronic signals to cause the simultaneous piston closure period for a duration of a second X/3 ms. Following the second X/3 ms, the control unit 100 sends electronic signals to transition the valve pistons from a simultaneous piston closure to either the inlet or the outlet mode. At the end of the third and final X/3 ms period, the control unit 100 will send electronic signals to increase the hydraulic output of the hydraulic pump 12 so that the reciprocating assembly 300 accelerates from a zero velocity, in either the first or second direction as the case may be.

In such a feature, the dwell period may last, for example between 200 and 500 ms. During this dwell period, the inlet piston 416 and the outlet piston 516 are simultaneously closed during the approximate middle 66 to 166 ms of the dwell period. This 50 to 100 ms of simultaneous piston closure can decrease any deleterious pressure buildups and allow the control unit 100 to more closely match the actual position of the reciprocating assembly 300 with the assembly profile. The simultaneous piston closure within the middle of the dwell time allows for the actual time it takes for the concentrate valve bodies 400, 401 to respond to the signal from the control unit 100. For example, it can take 25 to 50 ms for the valves to actually actuate from the open position to the closed position, or vice versa, referred to as the "time to actuate". Further, the simultaneous piston closure of both of the inlet and outlet pistons 416, 516 prevents any high pressure concentrate from being misdirected. For example, if the concentrate valve body 400 is about to enter the inlet phase, and the outlet piston 516 is open when the inlet piston 416 opens, then some of the high pressure concentrate can be misdirected across the central chamber 414 and directly into the outlet end 406. Such a misdirection of the high pressure concentrate would impair the energy recovery efficiency of the system.

In an additional optional feature, the length of the dwell time may be between 200 and 300 ms with a period of simultaneous piston closure of approximately 66 to 100 ms.

In an additional optional feature, the period of simultaneous piston closure occurs ms prior to the start of the dwell period, for example 100 to 500 ms prior to the reciprocating assembly 300 achieving a velocity of zero. The purpose of this feature is to build a relatively small amount of pressure within the system to compensate for an expansion effects that may occur due to the use of the various polymer materials that are utilized for their corrosion-resistant and low friction properties rather than the stiffness or rigidity properties.

In an additional optional feature, a fail safe system that includes one or more pressure sensors (not shown) may be included in the system to detect changes in pressure within the system. For example, the fail safe system may include pressure systems located in the central chamber 414 of the concentrate valve bodies 400, 401 and via these sensors, the fail safe system will provide pressure information from the central chamber 414 to the control unit 100. The pressure information can be integrated into the timing protocol 130. In one example of such an optional feature, the electronic controller 100 will follow the incorporation of the assembly sequence 132 and the valve sequence 134 unless the fail safe alerts the control unit 100 that an aberrant pressure, with respect to the timing protocol 130, is detected. In such an example, the control unit 100 could pause either the assembly sequence 132, so that the reciprocating assembly 300 does not exit a dwell period and contribute further to the detected pressure aberration. Alternatively, the electronic control system 100 could alter the valve sequence 132 so there is a longer, shorter or no period of simultaneous piston closure. The control unit 100 could regularly query the fail safe system, for example every 1 ms to determine if the aberrant pressure signal remains or has subsided and then respond appropriately.

In an additional optional feature, the control unit 100 may regularly query the fail safe system prior to actuating the concentrate valve bodies 400, 401. For example, the control unit 100 could ensure that the reciprocating assembly 300 is not moving, and therefore in a dwell period, by the outer feed back loop 120. However, the control unit 100 also has to be verify that there is minimal pressure actually detected in the central chamber 414 of a concentrate valve body 400, 401 that is about to enter a phase of simultaneous piston closure.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

This written description uses examples to disclose the invention, including the best mode, to enable any person skilled in the art to practice the invention, including making and using any devices or systems and performing any incorporated methods. The patentable scope of the invention is defined by the claims, and may include other examples that occur to those skilled in the art.

We claim:

1. An apparatus comprising,
   a) a membrane system having a feed water inlet and a brine outlet;
   b) a pump comprising a piston rod connected to a piston in a cylinder, the piston having a front face and a back face, the pump adapted to pressurize feed water against the front face of the piston and to cause the feed water to flow to the feed water inlet of the membrane system;
   c) a conduit connecting the brine outlet of the membrane system to the back face of the piston;
   d) a valve in the conduit;
   e) a hydraulic pump connected to the piston rod, the hydraulic pump comprising a hydraulic cylinder with a hydraulic piston connected to the piston rod, a pair of hydraulic lines connected to provide fluid to chambers adjacent to opposed faces of the hydraulic piston, and a flow control mechanism to selectively pressurize the hydraulic lines;
   f) a controller connected to the hydraulic pump;
   g) a first sensor operatively coupled to the hydraulic pump and configured to detect a position of the flow control mechanism related to the actual fluid flow output of the hydraulic pump, the first sensor connected to the controller and adapted to send a first signal to the controller via an inner control loop indicating the output of the hydraulic pump,
   h) a second sensor operatively coupled to the piston rod and configured to detect a position of the piston rod, the second sensor connected to the controller and adapted to send a second signal to the controller via an outer control loop indicating the position of the piston rod,
      wherein the controller is programmed with a desired profile of velocity of the piston over time, and programmed to instruct the hydraulic pump to move the piston according to the profile, process the first signal indicating the output of the hydraulic pump and the second signal indicating the position of the piston rod, determine a desired position value and a desired velocity value for the piston based on the desired profile, subtract an actual position value of the piston from the desired position value to determine a first difference and multiply the first difference by a first gain factor to generate a first multiplied value, subtract an actual velocity value of the piston from the desired velocity value to determine a second difference and multiply the second difference by a second gain factor to generate a second multiplied value, sum the first multiplied value and the second multiplied value to generate a sum value, generate a flow control command based on the sum value, and alter the instructions by sending the flow control command to the flow control mechanism via the inner control loop to cause the piston to more nearly follow the profile.

2. The apparatus of claim 1 wherein the controller is connected to the valve, the profile includes dwell periods in which the piston is not intended to be moving, and the controller is programmed to move the valve during the dwell periods.

3. The apparatus of claim 2 wherein the controller is programmed to delay the start of a movement of the valve until after the start of a dwell period.

4. The apparatus of claim 1 wherein the valve has a valve piston that closes against a downstream seat inside of a valve body, the face of the valve piston has a central area that contacts the seat when the valve is closed, the face of the valve piston also has an outer ring, the outer ring is recessed relative to the central area, and the back of the piston can be connected to the valve body downstream of the seat.

5. The apparatus of claim 4 wherein the piston is biased towards the closed position.

6. The apparatus of claim 1 wherein the piston and cylinder are made using corrosion resistant materials and low friction materials.

7. The apparatus of claim 1 wherein the hydraulic pump comprises a swash plate and the first signal indicates the angle of the swash plate.

8. A process comprising the steps of,
   a) providing a water pump, the water pump comprising a piston in a cylinder, the piston connected to a piston rod;
   b) providing a hydraulic pump connected to the piston rod such that a fluid flow output from the hydraulic pump causes the piston to move, the hydraulic pump comprising a flow control mechanism controllable to produce the fluid flow output;
   c) connecting the water pump to a membrane system such that movement of the piston causes feed water to flow to the membrane system;
   d) instructing the hydraulic pump to produce a fluid flow output predicted to cause the piston to move according to a predetermined profile of velocity over time;
   e) detecting a position of the flow control mechanism of the hydraulic pump to produce a first signal related to the actual fluid flow output of the hydraulic pump and sending the first signal to a controller via an inner control loop;
   f) detecting a position of the piston rod to produce a second signal related to the position of the piston and sending the second signal to the controller via an outer control loop;
   g) determining a desired position value and a desired velocity value for the piston based on the desired profile, subtracting an actual position value of the piston from the desired position value to determine a first difference and multiplying the first difference by a first gain factor to generate a first multiplied value, subtracting an actual velocity value of the piston from the desired velocity value to determine a second difference and multiplying the second difference by a second gain factor to generate a second multiplied value, summing the first multiplied value and the second multiplied value to generate a sum value, and generating a flow control command based on the sum value;

h) modifying the instructions by sending the flow control command from the controller to the hydraulic pump via the inner control loop to cause the piston to more closely follow the profile.

9. The process of claim 8 further comprising a step of using the pressure of a brine produced in the membrane system to assist in causing the piston to move to cause the feed water to flow.

10. The process of claim 9 further comprising steps of providing a valve configured to selectively connect the brine to the piston and instructing the valve to be open when the profile indicates that the piston should be moving in a forward direction and to close when the profile indicates that the piston should be moving in a reverse direction.

11. The process of claim 10 wherein the profile includes dwell periods in which the piston is not intended to be moving, and wherein the valve is instructed to open or close during the dwell periods.

12. The process of claim 11 further wherein an instruction to open or close a valve during a dwell period is delayed relative to the start of the dwell period.

13. The process of claim 12 wherein the velocity profile includes a decrease in piston velocity towards the dwell periods and the valve is configured to move towards a closed position when the flow rate of water through the valve decreases.

14. The process of claim 8 wherein the hydraulic pump comprises a swash plate and the first signal related to the actual fluid flow output of the hydraulic pump is a signal indicating the angle of the swash plate.

15. The apparatus of claim 1 wherein the piston rod comprises a first rod connected to one face of the hydraulic piston and a second rod connected to the opposite face of the hydraulic piston.

16. The apparatus of claim 1 wherein the piston rod is connected to the piston by a connection rod.

* * * * *